United States Patent
Katayama et al.

(10) Patent No.: US 10,550,280 B2
(45) Date of Patent: Feb. 4, 2020

(54) HOLLOW PARTICLES, METHOD FOR PRODUCING SAME, USE THEREOF, AND METHOD FOR PRODUCING MICROCAPSULE PARTICLES

(71) Applicant: SEKISUI PLASTICS CO., LTD., Osaka (JP)

(72) Inventors: Yugo Katayama, Nara (JP); Kengo Nishiumi, Nara (JP); Ayumi Kiyohara, Nara (JP); Shuichi Sasahara, Nara (JP); Haruhiko Matsuura, Nara (JP); Junko Kubo, Nara (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 0 days.

(21) Appl. No.: 15/319,127

(22) PCT Filed: Jan. 6, 2016

(86) PCT No.: PCT/JP2016/050239
§ 371 (c)(1),
(2) Date: Dec. 15, 2016

(87) PCT Pub. No.: WO2016/111314
PCT Pub. Date: Jul. 14, 2016

(65) Prior Publication Data
US 2017/0114243 A1    Apr. 27, 2017

(30) Foreign Application Priority Data

Jan. 8, 2015 (JP) ................. 2015-002463
Mar. 18, 2015 (JP) ................. 2015-054828

(Continued)

(51) Int. Cl.
*C09D 133/14* (2006.01)
*C09D 5/00* (2006.01)
(Continued)

(52) U.S. Cl.
CPC ............ *C09D 133/14* (2013.01); *B01J 13/18* (2013.01); *C08F 220/32* (2013.01); *C09D 5/006* (2013.01);
(Continued)

(58) Field of Classification Search
CPC ....................... C08F 2220/325; C08F 220/32
See application file for complete search history.

(56) References Cited

U.S. PATENT DOCUMENTS

2007/0251422 A1* 11/2007 Maenaka ............... C08G 18/30
                                                  106/287.28
2008/0227893 A1    9/2008 Tamori et al.
2011/0020648 A1    1/2011 Fukazawa et al.

FOREIGN PATENT DOCUMENTS

JP    H062-127336 A    6/1987
JP    H07-265686 A    10/1995
(Continued)

OTHER PUBLICATIONS

Machine Translation JP2006-227334 (Year: 2006).*
(Continued)

Primary Examiner — Alexandre F Ferre
(74) Attorney, Agent, or Firm — Greenblum & Bernstein, P.L.C.

(57) ABSTRACT

Provided are hollow particles each having a shell including at least one layer, wherein the hollow particles have an average particle diameter of 10 to 200 nm and the at least one layer contains a vinyl-based resin.

17 Claims, 3 Drawing Sheets

(30) Foreign Application Priority Data

Sep. 25, 2015 (JP) ................................ 2015-188269
Sep. 29, 2015 (JP) ................................ 2015-191354
Nov. 24, 2015 (JP) ................................ 2015-228797

(51) Int. Cl.

| | | |
|---|---|---|
| *G02B 1/11* | (2015.01) | |
| *B01J 13/18* | (2006.01) | |
| *C08F 220/32* | (2006.01) | |
| *G02B 5/02* | (2006.01) | |
| *C09K 5/14* | (2006.01) | |
| *C09D 7/40* | (2018.01) | |

(52) U.S. Cl.
CPC ................ *C09D 7/67* (2018.01); *C09D 7/68* (2018.01); *C09D 7/70* (2018.01); *C09K 5/14* (2013.01); *G02B 1/11* (2013.01); *G02B 5/0242* (2013.01); *G02B 5/0247* (2013.01); *C08F 2220/325* (2013.01); *C08F 2500/24* (2013.01); *C08F 2500/26* (2013.01); *C08F 2800/20* (2013.01); *C08F 2810/20* (2013.01)

(56) References Cited

FOREIGN PATENT DOCUMENTS

| | | |
|---|---|---|
| JP | 2001-233611 A | 8/2001 |
| JP | 2001-253966 A | 9/2001 |
| JP | 2002-80503 A | 3/2002 |
| JP | 2004-292250 A | 10/2004 |
| JP | 2005-215315 A | 8/2005 |
| JP | 2006-89648 A | 4/2006 |
| JP | 2006-227334 A | 8/2006 |
| JP | 2007-70458 A | 3/2007 |
| JP | 2010-32719 A | 2/2010 |
| JP | 2010084017 A | 4/2010 |
| JP | 2012-56138 A | 3/2012 |
| TW | 200745174 A1 | 12/2007 |
| TW | 201226451 A1 | 7/2012 |
| WO | 2005/071014 A1 | 8/2005 |
| WO | 2005/097870 A1 | 10/2005 |

OTHER PUBLICATIONS

Machine Translation JPH07-265686 (Year: 1995).*
International Search Report issued with respect to Application No. PCT/JP2016/050239, dated Apr. 5, 2016.
Extended European Search Report in respect to European Application No. 16735053.7, dated Jan. 18, 2018.
WPI/ Clarivate Analytics, "XP-002777225" summarizing JP 2006-089648 (cited in IDS filed Mar. 10, 2017).
WPI/ Clarivate Analytics, "XP-002777226" summarizing JP 2010-084017.

* cited by examiner 100 nm

HOLLOW PARTICLES, METHOD FOR PRODUCING SAME, USE THEREOF, AND METHOD FOR PRODUCING MICROCAPSULE PARTICLES

TECHNICAL FIELD

The present invention relates to hollow particles, a method for producing the same, use thereof, and a method for producing microcapsule particles. More particularly, the present invention relates to microcapsule particles and hollow particles which each have a small particle diameter and high monodispersibility and generate a small amount of pinholes in a shell, a method for producing them, and use of hollow particles. The hollow particles of the present invention are also suitable for preparing a film having low heat conductibility and low reflectivity.

BACKGROUND TECHNOLOGY

Particles having a hollow in their inside (having a hollow surrounded with a shell) are called hollow particles, and are used as, for example, an optical scattering material, a heat insulating material, a low reflection material or the like. The particles are also used as microcapsule particles by encapsulating various substances in their hollow. For example, Japanese Unexamined Patent Application, First Publication No. 2001-233611 (Patent Document 1) and Japanese Unexamined Patent Application, First Publication No. 2007-070458 (Patent Document 2) describe hollow silica particles consisting of a silica shell and a heat insulating paint using the same.

As a method for producing hollow particles, for example, Japanese Unexamined Patent Application, First Publication No. 2002-80503 (Patent Document 3) and Japanese Unexamined Patent Application, First Publication No. 2005-215315 (Patent Document 4) describe a method for producing hollow particles by preparing oil droplets comprising a radical polymerization reactive monomer, and a hardly water-soluble organic solvent having low compatibility with a polymer of this monomer in a water solvent, followed by polymerization.

Japanese Unexamined Patent Application. First Publication No. 2006-89648 (Patent Document 5) also describes a method for producing hollow particles by preparing oil droplets containing a reactive monomer having a radical polymerizable functional group and a crosslinkable functional group, and an organic solvent, and after polymerization, reacting the crosslinkable functional group.

Moreover, International Publication No. WO 2005/097870 (Patent Document 6) describes hollow particles obtained by emulsifying, in a polar solvent, a reaction solution consisting of a reactive silane coupling agent, a non-reactive solvent, and a polymerization initiator, and polymerizing, and hollow particles obtained by emulsifying a mixed solution consisting of an epoxy prepolymer and a non-reactive solvent in a polar solvent, adding a polyamine to prepare hollow resin particles, and inorganic-crosslinking the prepared hollow resin particles with a silane coupling agent having an amino group.

Japanese Unexamined Patent Application. First Publication No. Sho 62-127336 (Patent Document 7) and International Publication No. WO 2005/071014 (Patent Document 8) also describe a method for producing hollow particles obtained by absorbing a crosslinkable monomer in seed particles, and polymerizing the crosslinkable monomer.

PRIOR ART DOCUMENTS

Patent Documents

Patent Document 1: Japanese Unexamined Patent Application. First Publication No. 2001-233611
Patent Document 2: Japanese Unexamined Patent Application. First Publication No. 2007-070458
Patent Document 3: Japanese Unexamined Patent Application, First Publication No. 2002-80503
Patent Document 4: Japanese Unexamined Patent Application, First Publication No. 2005-215315
Patent Document 5: Japanese Unexamined Patent Application. First Publication No. 2006-89648
Patent Document 6: International Publication No. WO2005/097870
Patent Document 7: Japanese Unexamined Patent Application, First Publication No. Sho 62-127336
Patent Document 8: International Publication No. WO 2005/071014

SUMMARY OF THE INVENTION

Problem to be Solved by the Invention

In the shell of the hollow particles of Patent Documents 1 to 8, pores penetrating from a surface towards a hollow therethrough (pinholes) are however generated easily. For this reason, when mixed with a hinder used in an optical scattering material, a heat insulating material, a low reflection material or the like, the binder easily infiltrates into the hollow, and desired properties (light scattering property, heat insulating property, light reflectivity, and the like) were not obtained, in some cases. Also, there was a problem that dispersibility into the binder is low, and a coated film is easily whitened.

Means for Solving the Problem

Thus, in accordance with the present invention, there are provided hollow particles each having a shell including at least one layer, wherein
the hollow particles have an average particle diameter of 10 to 200 nm, and
the at least one layer contains a vinyl-based resin.
Also, in accordance with the present invention, there is provided a coating agent comprising the hollow particles.
Furthermore, in accordance with the present invention, there is provided an antireflection film comprising the hollow particles.
Furthermore, in accordance with the present invention, there is provided a light extraction film comprising the hollow particles.
Furthermore, in accordance with the present invention, there is provided a dispersion comprising the hollow particles.
Also, in accordance with the present invention, there is provided a heat insulating film comprising the hollow particles.
Furthermore, in accordance with the present invention, there is provided a heat conductivity adjusting agent in the form of hollow particles each having a shell including at least one layer, wherein the hollow particles have an average particle diameter of 10 to 150 nm and a gel fraction of 95% or more, and the at least one layer contains a vinyl-based resin.

Also, in accordance with the present invention, there is provided a method for producing microcapsule particles, comprising the steps of:

(a) polymerizing a reactive monomer having a radical polymerizable functional group and a non-radical polymerizable functional group based on any one of the both functional groups, in a dispersing medium, in the presence of a non-reactive solvent incompatible with the dispersing medium, or (b) polymerizing a reactive monomer having a radical polymerizable functional group and a non-radical polymerizable functional group based on any one of the both functional groups, in the absence of the non-reactive solvent, and then absorbing the non-reactive solvent, thereby, preparing polymer particles containing the non-reactive solvent, and phase-separating the non-reactive solvent from the polymer particles containing the non-reactive solvent by polymerization with other remaining functional group of the both functional groups, thereby, producing microcapsule particles.

Furthermore, in accordance with the present invention, there is provided a method for producing hollow particles by removing a non-reactive solvent encapsulated in the microcapsule particles, thereby, obtaining hollow particles.

Effects of Invention

In accordance with the present invention, there can be provided microcapsule particles and hollow particles which generate little pinholes, and have high monodispersibility, as well as a method for producing them.

Also, in accordance with the present invention, there can be provided hollow particles which each have a small particle diameter and high monodispersibility, and are suitable for preparing a film having low reflectivity.

In accordance with the present invention, when the present invention has any of the following aspects, there can be provided hollow particles which each have a small particle diameter and high monodispersibility, and are more suitable for preparing a film having low reflectivity.

(1) The hollow particles each having a shell including at least one layer, wherein the hollow particles have an average particle diameter of 10 to 200 nm, and the at least one layer is composed of an organic-inorganic hybrid vinyl-based resin including a silicon-containing vinyl-based resin.

(2) The silicon-containing vinyl-based resin comprises a crosslinked copolymer derived from a copolymer including at least one radical reactive monomer having an epoxy group or an oxetane group, and at least one radical reactive monomer having a silyl group.

(3) The hollow particles exhibit a 5% degradation initiation temperature of 250 to 350° C.

(4) The radical reactive monomer having an epoxy group or an oxetane group is selected from p-glycidylstyrene, glycidyl (meth)acrylate, 4-hydroxybutyl (meth)acrylate glycidyl ether, (3-ethyloxetan-3-yl)methyl (meth)acrylate, and 3,4-epoxycyclohexylmethyl (meth)acrylate.

(5) The radical reactive monomer having a silyl group is selected from vinyltrichlorosilane, vinyltrimethoxysilane, vinyltriethoxysilane, p-styrylmethoxysilane, 3-methacryloxypropyldimethoxysilane, 3-methacryloxypropyltrimethoxysilane, 3-methacryloxypropylmethyldiethoxysilane, 3-methacryloxypropyltriethoxysilane, and 3-acryloxypropyltrimethoxysilane.

(6) The crosslinked copolymer is a crosslinked copolymer obtained by crosslinking with a polyamine-based compound.

(7) The hollow particles each having a shell including at least one layer, wherein the hollow particles have an average particle diameter of 10 to 150 nm and a gel fraction of 95% or more, a BET specific surface area $S_B$ of the hollow particles and a theoretical specific surface area $S_T$ which is calculated from an average particle diameter and a hollow rate satisfy the following equation:

$$0.5 \leq S_B/S_T \leq 2.5, \text{ and}$$

the at least one layer contains a vinyl-based resin.

(8) The hollow particles have a hollow rate of 5 to 90%.

(9) The vinyl-based resin is an organic-inorganic hybrid vinyl-based resin having a silicon component.

Furthermore, in accordance with the present invention, there can be provided a heat conductivity adjusting agent in the form of hollow particles which each have a small particle diameter and high monodispersibility, and are suitable for preparing a film having low heat conductivity.

In accordance with the present invention, when the present invention has any of the following aspects, there can be provided microcapsule particles and hollow particles which each have less pinhole and high monodispersibility, as well as a method for producing them.

(1) The radical polymerizable functional group is selected from a vinyl group, a (meth)acryloyl group, an allyl group, a maleoyl group, a fumaroyl group, a styryl group, and a cinnamoyl group, and the non-radical polymerizable functional group is selected from an epoxy group, an alkoxysilyl group, an isocyanate group, a carboxyl group, a carbonyl group, a sulfonyl group, a chlorosulfonyl group, a hydroxy group, an alkoxyalkyl group, a mercapto group, a nitrile group, an amino group, an acetate group, an acetylacetonato group, an aziridino group, an oxazolino group, and a silanol group.

(2) The reactive monomer is selected from:

p-glycidylstyrene, glycidyl (meth)acrylate, 4-hydroxybutyl (meth)acrylate glycidyl ether, and 3,4-epoxycyclohexylmethyl (meth)acrylate, each having an epoxy group, vinyltrichlorosilane, vinyltrimethoxysilane, vinyltriethoxysilane, p-styrylmethoxysilane, 3-methacryloxypropyldimethoxysilane, 3-methacryloxypropyltrimethoxysilane, 3-methacryloxypropylmethyldiethoxysilane, 3-methacryloxypropyltriethoxysilane, and 3-acryloxypropyltrimethoxysilane, each having an alkoxysilyl group.

2-isocyanatoethyl (meth)acrylate having an isocyanate group, and 2-(O-[1'-methylpropylideneamino]carboxyamino)ethyl (meth)acrylate and 2-[(3,5-dimethylpyrazolyl)carbonylamino]ethyl (meth)acrylate, each having an amino group, the dispersing medium is selected from water, ethanol, methanol, isopropyl alcohol, butane, pentane, hexane, cyclohexane, heptane, decane, hexadecane, toluene, xylene, ethyl acetate, butyl acetate, methyl ethyl ketone, methyl isobutyl ketone, methyl chloride, methylene chloride, chloroform, and carbon tetrachloride, and the non-reactive solvent is a solvent incompatible with the dispersing medium, and is selected from butane, pentane, hexane, cyclohexane, heptane, decane, hexadecane, toluene, xylene, ethyl acetate, butyl acetate, methyl ethyl ketone, methyl isobutyl ketone, 1,4-dioxane, methyl chloride, methylene chloride, chloroform, and carbon tetrachloride.

Figure 1:
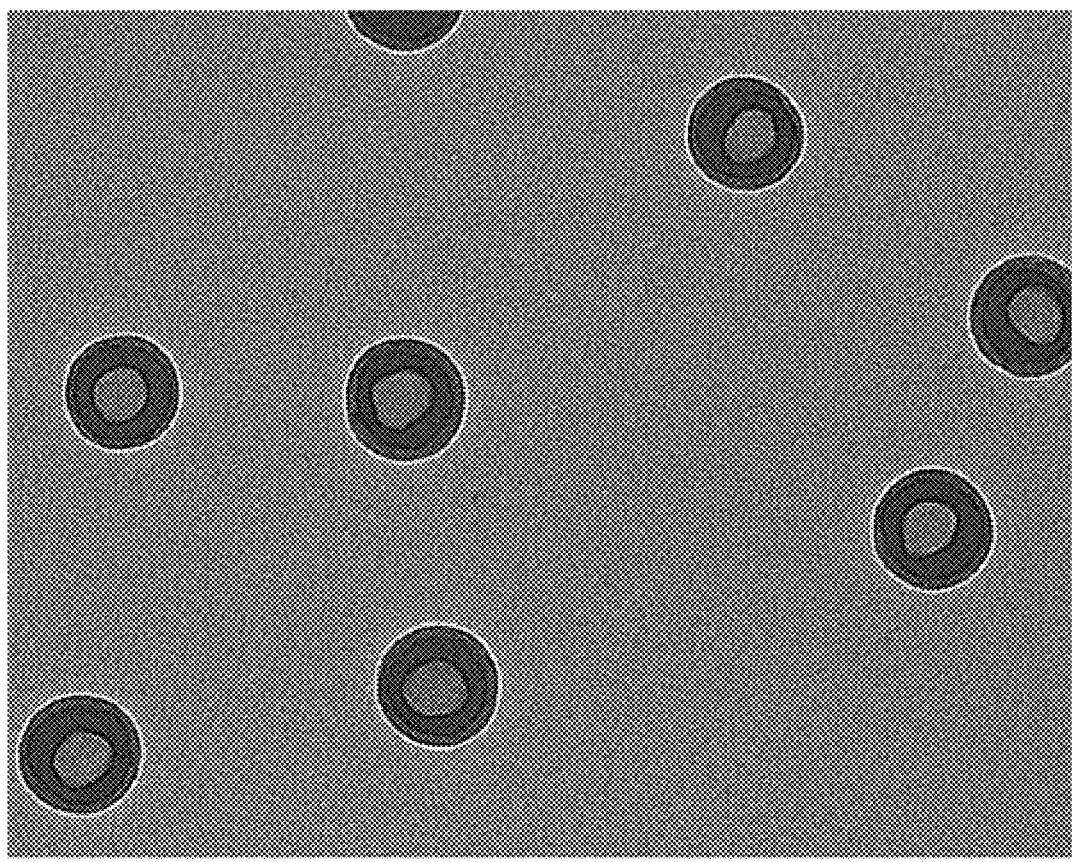
FIG. 1 is a photograph of hollow particles of Example 1A.

BEST MODE FOR CARRYING OUT THE INVENTION (Hollow Particles)

Hollow particles (hereinafter, hollow particles including hollow particles for a heat conductivity adjusting agent are simply referred to as hollow particles) each have a shell including at least one layer. Layer(s) constituting the shell may include one layer or a multilayer of two or more layers.

The hollow particles have an average particle diameter of 10 to 200 nm. The hollow particles having an average particle diameter of less than 10 nm may generate aggregation between the hollow particles and may be inferior in handleability. In the hollow particles larger than 200 nm, when kneaded with a coating agent or a resin, irregularities of a surface and scattering at a particle interface may become great, and the hollow particles may be whitened. A preferable average particle diameter is 10 to 150 nm, a more preferable average particle diameter is 30 to 120 nm, a further preferable average particle diameter is 30 to 100 nm, and a particularly preferable average particle diameter is 30 to 80 nm. An average particle diameter can take 10 nm, 30 nm, 50 nm, 80 nm, 100 nm, 120 nm, 150 nm, and 200 nm.

Furthermore, it is preferable that the hollow particles have a gel fraction of 95% or more. The hollow particles having a gel fraction of less than 95% may have low chemical resistance, and when mixed with a coating agent or the like, may be easily swollen, and the coating agent may enter the inside thereof. A preferable gel fraction is 97% or more, and an upper limit of a gel fraction is 100%.

It is preferable that the hollow particles exhibit a 5% degradation initiation temperature of 250 to 350° C. In the case where a 5% degradation initiation temperature is lower than 250° C. when kneaded with a coating agent or a resin, the particles may collapse, and heat resistance of the resulting kneading product may be deteriorated. In the case where a 5% degradation initiation temperature is higher than 350° C., the shell becomes brittle and may become easy to generate pinholes. A more preferable 5% degradation initiation temperature is 260 to 330° C., and a further preferable 5% degradation initiation temperature is 260 to 320° C. A 5% degradation initiation temperature can take 250° C., 260° C., 270° C., 300° C., 310° C., 320° C., 330° C., and 350° C.

The hollow particles have a CV value being an index of assessment of monodispersibility, of preferably 30% or less, more preferably 25% or less, and further preferably 20% or less. The CV value can take 30% or less, 25% or less, 20% or less, 15% or less, 10% or less, and 5% or less.

It is preferable that the hollow particles have a hollow rate of 10 to 90%. When a hollow rate is less than 10%, a hollow portion is small, and desired properties may not be obtained. When a hollow rate is greater than 90%, a hollow portion becomes too large, and the strength of the hollow particles may be reduced. A hollow rate can take 10%, 20%, 30%, 40%, 50%, 60%, 70%, 80%, and 90%. Herein, a hollow of the hollow particles may be filled with a gas such as the air, or may be filled with a solvent, a solution or a dispersion. Particles composed of a shell surrounding the hollow, and a solvent, a solution or a dispersion filling the hollow are also called microcapsule particles.

It is preferable that the shell of the hollow particles has less pinholes. In the case where the shell has many pinholes, when these particles are used in an optical scattering material, a low reflection material or the like, a low-molecular binder component easily infiltrates into the hollow. For this reason, when used as a low reflection material, reflectivity of a film cannot be reduced, in some cases.

It is preferable that a value obtained by dividing a BET specific surface area $S_B$ of the hollow particles by a theoretical specific surface area $S_T$ which is calculated from an average particle diameter and a hollow rate ($S_B/S_T$) is 0.5 to 2.5. In addition, a method of measuring $S_B$ and $S_T$ is described in the column of Examples.

When pinholes exist on a particle surface, and the particle surface has become irregular, $S_B/S_T$ becomes great. When $S_B/S_T$ becomes greater than 2.5, a number of pinholes exist on a shell surface, and when mixed with a binder for use in an optical scattering material, a heat insulating material, a low reflection material or the like, a low-molecular binder component may infiltrate into the hollow, and thus desired properties (light scattering property, heat insulating property, light reflection property, and the like) may not be obtained.

When pinholes do not exist on a particle surface, and the particle surface has become smooth, $S_B/S_T$ becomes 1.0. However, when an average particle diameter is very small, or when a deviation or a peak exists in a particle size distribution, $S_B/S_T$ may become less than 1.0.

$S_B/S_T$ is more preferably 0.5 to 2.0, and further preferably 0.7 to 1.5. $S_B/S_T$ can take 0.5, 0.7, 0.9, 1.0, 1.2, 1.5, 1.7, 2.0, and 2.5.

In addition, $S_B$ is preferably in the range of 30 to 350 m$^2$/g, and $S_T$ is preferably in the range of 30 to 350 m$^2$/g. $S_B$ and $S_T$ each can take 30 m$^2$/g, 100 m$^2$/g, 150 m$^2$/g, 200 m$^2$/g, 250 m$^2$/g, 300 m$^2$/g, and 350 m$^2$/g.

At least one layer contains a vinyl-based resin. The vinyl-based resin is obtained by polymerizing or copolymerizing at least one monomer having a radical polymerizable functional group such as a vinyl group, a (meth)acryloyl group, an allyl group, a maleoyl group, a fumaroyl group, a styryl group, and a cinnamoyl group.

The content of the vinyl-based resin of the hollow particles is preferably such that the vinyl-based resin is 5 to 100 parts by weight based on 100 parts by weight of the hollow particles. When the content is less than 5 parts by weight, for example, dispersibility into an organic binder used for preparing a heat insulating paint is deteriorated and thus a coated film may easily be whitened. The content of the vinyl-based resin is more preferably 10 to 100 parts by weight, and further preferably 20 to 100 parts by weight. The content can take 5 parts by weight, 10 parts by weight, 20 parts by weight, 40 parts by weight, 60 parts by weight, 80 parts by weight, and 100 parts by weight.

In the vinyl-based resin, a variety of resins can be used. Examples thereof include resins derived from a reactive monomer having a radical polymerizable functional group and a non-radical polymerizable functional group.

(a) Reactive Monomer

The radical polymerizable functional group is not particularly limited, as long as it is an ethylenic unsaturated group which reacts in radical polymerization. Examples thereof include a vinyl group, a (meth)acryloyl group, an allyl group, a maleoyl group, a fumaroyl group, a styryl group, a cinnamoyl group, and the like. Among them, a vinyl group, a (meth)acryloyl group, and an allyl group, reactivity of which is easily controlled, are preferable.

The non-radical polymerizable functional group is not particularly limited, as long as it is a polymerizable functional group other than the radical polymerizable functional group. Examples thereof include an epoxy group, an oxetane group, a silyl group (for example, alkoxysilyl group), an isocyanate group, a carboxyl group, a carbonyl group, a sulfonyl group, a chlorosulfonyl group, a hydroxy group, an alkoxyalkyl group, a mercapto group, a nitrile group, an amino group, an acetate group, an acetylacetonato group, an aziridino group, an oxazolino group, a silanol group, a chlorosilane group, and the like. Among them, an amino group, an epoxy group, an oxetane group, a silyl group, and an isocyanate group, reactivity of which is easily controlled, are preferable.

An epoxy group and an oxetane group are functional groups which react with a compound having an amino group, a carboxyl group, a chlorosulfone group, a mercapto group, a hydroxy group, an isocyanate group or the like to generate a polymer. The reactive monomer having a radical polymerizable functional group and an epoxy group or an oxetane group is not particularly limited. Examples thereof include p-glycidylstyrene, glycidyl (meth)acrylate, 4-hydroxybutyl (meth)acrylate glycidyl ether, (3-ethyloxetan-3-yl)methyl (meth)acrylate, 3,4-epoxycyclohexylmethyl (meth)acrylate, and the like.

The silyl group is a functional group which is hydrolyzed to generate a silanol group, and in which the generated silanol groups are reacted to generate a polymer, or a functional group which reacts with a compound having a hydroxy group to generate a polymer. The reactive monomer having a radical polymerizable functional group and a silyl group is not particularly limited. Examples thereof include vinyltrichlorosilane, vinyltrimethoxysilane, vinyltriethoxysilane, vinyltris(2-methoxyethoxy)silane, vinyltriacetoxysilane, vinylmethyldimethoxysilane, allyltrimethoxysilane, p-styrylmethoxysilane, 3-(meth)acryloxypropyldimethoxysilane, 3-(meth)acryloxypropyltrimethoxysilane, 3-(meth)acryloxypropylmethyldiethoxysilane, 3-(meth)acryloxypropyltriethoxysilane, and the like.

The isocyanate group is a functional group which reacts with water, or a compound having an amino group, a hydroxy group, a carboxyl group or the like to generate a polymer. The reactive monomer having a radical polymerizable functional group and an isocyanate group is not particularly limited. Examples thereof include 2-isocyanatoethyl (meth)acrylate and the like. The isocyanate group may be protected until the time of phase separation and deprotected at the time of phase separation to generate an isocyanate group.

Examples of the reactive monomer which is deprotected at the time of phase separation to generate an isocyanate group include 2-(O-[1'-methylpropylideneamino]carboxyamino)ethyl (meth)acrylate, 2-[(3,5-dimethylpyrazolyl)carbonylamino]ethyl (meth)acrylate, and the like.

The reactive monomers may be used alone, or two or more of them may be used together.

Among the vinyl-based resin, an organic-inorganic hybrid vinyl-based resin containing a silicon component (hereinafter, referred to as silicon-containing vinyl-based resin) is preferable. In the present specification, "organic-inorganic" means that the resin contains silicon as an inorganic component, and a vinyl-based resin other than silicon as an organic component.

The silicon-containing vinyl-based resin is obtained by polymerizing or copolymerizing at least one monomer having a radical polymerizable functional group such as a vinyl group, a (meth)acryloyl group, an allyl group, a maleoyl group, a fumaroyl group, a styryl group, and a cinnamoyl group.

It is preferable that the silicon-containing vinyl-based resin comprises a crosslinked copolymer obtained by crosslinking a copolymer including at least one radical reactive monomer having an epoxy group or an oxetane group, and at least one radical reactive monomer having a silyl group.

(1) Radical Reactive Monomer Having Epoxy Group or Oxetane Group

The at least one radical reactive monomer having an epoxy group or an oxetane group comprises the epoxy group or the oxetane group and a radical polymerizable functional group. Specific examples of this monomer have been described above.

(2) Radical Reactive Monomer Having Silyl Group

The at least one radical reactive monomer having a silyl group comprises the silyl group and a radical polymerizable functional group. Specific examples of this monomer have been described above.

(3) Copolymer Including Radical Polymerizable Monomer Having Epoxy Group or Oxetane Group and Radical Reactive Monomer Having Silyl Group In the copolymer, a ratio of components derived from the radical polymerizable monomer having an epoxy group or an oxetane group and components derived from the radical reactive monomer having a silyl group (weight ratio) is preferably 1:100 to 1:0.001. When the ratio of components derived from the radical polymerizable monomer having a silyl group is less than 0.001, the strength of the shell is reduced, the hollow particles collapse, heat resistance is deteriorated, and thus the hollow particles may not be obtained. When the ratio is greater than 100, the shell becomes too brittle, and pinholes become easy to be generated, thereby, it may become difficult to reduce reflectivity of a film and/or increasing heat insulating property of a film. A more preferable ratio is 1:10 to 1:0.001, and a further preferable ratio is 1:1 to 1:0.01. The ratio can take 1:100, 1:50, 1:10, 1:1, 1:0.1, 1:0.01, and 1:0.001.

The content of components derived from the radical polymerizable monomer having an epoxy group or an oxetane group and the radical reactive monomer having a silyl group is preferably 10% by weight or more of the whole components derived from the reactive monomer. When the content is less than 10% by weight, particles may not become the hollow particles. The content of components derived from the radical reactive monomer having an epoxy group or an oxetane group and the radical reactive monomer having a silyl group is more preferably 30% by weight or more, and further preferably 50% by weight or more. The content can take 10% by weight or more, 30% by weight or more, 50% by weight or more, 70% by weight or more, 90% by weight or more, and 100% by weight.

(4) Crosslinked Copolymer

When the functional group to be polymerized is a non-radical polymerizable functional group, the vinyl-based resin may comprise components derived from a crosslinking agent. When the non-radical polymerizable functional group is a self-crosslinking group, it is not necessary to use a crosslinking agent. The crosslinking agent is different depending on a polymerizable functional group species to be crosslinked therewith, and is not particularly limited. Examples thereof include aliphatic amines such as ethylenediamine and adducts thereof, diethylenetriamine, dipropylenetriamine, triethylenetetramine, tetraethylenepentamine, dimethylaminopropylamine, diethylaminopropylamine, dibutylaminopropylamine, hexamethylenediamine and modified products thereof, N-aminoethylpiperazine, bis-aminopropylpiperazine, trimethylhexamethylenediamine, bis-hexamethylenetriamine, dicyandiamide, diacetoacrylamide, various modified aliphatic polyamines, and polyoxypropylenediamine;

alicyclic amines such as 3,3'-dimethyl-4,4'-diaminodicyclohexylmethane, 3-amino-1-cyclohexylaminopropane, 4,4'-diaminodicyclohexylmethane, isophoronediamine, 1,3-bis(aminomethyl)cyclohexane, N-dimethylcyclohexylamine, and bis(aminomethyl)norbornane, and modified products thereof;

aromatic amines such as 4,4'-diaminodiphenylmethane (methylenedianiline), 4,4'-diaminodiphenyl ether, diaminodiphenylsulfone, m-phenylenediamine, 2,4'-toluylenediamine, m-toluylenediamine, o-toluylenediamine, meta-xylylenediamine, and xylylenediamine, and modified products thereof, and other special amine-modified products;

tertiary amines such as amidoamine, polyamidoamine such as an aminopolyamide resin, dimethylaminomethylphenol, 2,4,6-tri(dimethylaminomethyl)phenol, and a tri-2-ethylhexane salt of tri(dimethylaminomethyl)phenol;

boron trifluoride compounds and chelate compounds thereof, ketimines, imidazoles such as 2-methylimidazole, 2-ethyl-4-methylimidazole, 2-undecylimidazole, 2-heptadecylimidazole, 2-phenylimidazole, 2-phenyl-4-methylimidazole, 1-benzyl-2-methylimidazole, 2-ethylimidazole, 2-isopropylimidazole, 1-cyanoethyl-2-methylimidazole, 1-cyanoethyl-2-undecylimidazole, 1-cyanoethyl-2-isopropylimidazole, 1-cyanoethyl-2-phenylimidazole, 1-cyanoethyl-2-methylimidazole trimellitate, 1-cyanoethyl-2-undecylimidazole trimellitate, 1-cyanoethyl-2-phenylimidazole trimellitate, 2,4-diamino-6-[2'-methylimidazolyl-(1)']-ethyl-s-triazine, 2,4-diamino-6-[2'-undecylimidazolyl-(1)']-ethyl-s-triazine, 2,4-diamino-6-[2'-ethyl-4'-methylimidazolyl-(1)']-ethyl-s-triazine, 1-dodecyl-2-methyl-3-benzylimidazolium chloride, 1,3-dibenzyl-2-methylimidazolium chloride, 2-phenyl-4-methyl-5-hydroxymethylimidazole, 2-phenyl-4,5-dihydroxymethylimidazole, 1-cyanoethyl-2-phenyl-4,5-di(cyanoethoxymethyl)imidazole, a complex of 2-methylimidazole and triazine, and a complex of 2-phenylimidazole and triazine;

hydrazides such as isophthalic acid dihydrazide, adipic acid dihydrazide, and sebacic acid dihydrazide; acid anhydrides such as phthalic anhydride, pyromellitic anhydride, trimellitic anhydride and mixtures thereof, cyclopentane/tetracarboxylic dianhydride, hexahydrophthalic anhydride, methylhexahydrophthalic anhydride, tetramethylenemaleic anhydride, tetrahydrophthalic anhydride, methyl/tetrahydrophthalic anhydride, endomethylenetetrahydrophthalic anhydride, methylendomethylenetetrahydrophthalic anhydride, 5-(2,5-dioxotetrahydroxyfuryl)-3-methyl-3-cyclohexene-1,2'-dicarboxylic anhydride, and methylnadic anhydride, and modified products thereof;

polycarboxylic acids such as oxalic acid, adipic acid, azelaic acid, sebacic acid, malonic acid, succinic acid, 1,4-cyclohexyldicarboxylic acid, (o-, m-, p-)benzenedicarboxylic acid, maleic acid, and itaconic acid; polyols such as ethylene glycol, propylene glycol, 1,4-butanediol, 2,3-butanediol, 1,1,1-trimethylolpropane, polyethylene glycol, polyoxypropylene glycol, polyoxyalkylene glycol, dihydroxyethyl ether, hydroquinone, and dihydroxybenzophenone; mercaptans such as 1,6-hexanedithiol; polyfunctional phenols; polyfunctional aromatic isocyanates such as toluylene diisocyanate, a dimer of 2,4-toluylene diisocyanate, naphthylene-1,5-diisocyanate, o-toluylene diisocyanate, diphenylmethane diisocyanate, triphenylmethane triisocyanate, tris-(p-isocyanatophenyl) thiophosphite, and polymethylenepolyphenyl isocyanate; aromatic polyisocyanates; polyfunctional aromatic aliphatic isocyanates;

polyfunctional aliphatic isocyanates such as hexamethylene diisocyanate, trimethylhexamethylene diisocyanate, and isophorone diisocyanate; polyisocyanates such as block-type polyisocyanate; polyfunctional epoxy resins such as ethylene glycol diglycidyl ether, propylene glycol diglycidyl ether, glycerol polyglycidyl ether, diglycerol polyglycidyl ether, sorbitol polyglycidyl ether, various epoxy prepolymers of glycidyl ether type, glycidyl ester type, glycidyl amine type, aliphatic type, alicyclic type, novolak type, aminophenol type, hydantoin type, isocyanurate type, bisphenol type, and naphthalene type; and the like.

Only one kind of the crosslinking agents may be used, or two or more of the crosslinking agents may be used together.

(b) Other Reactive Monomer

In addition to components derived from the reactive monomer having a radical polymerizable functional group and a non-radical polymerizable functional group, components derived from other reactive monomers having only one reactive functional group may be contained, in such a range that the effect of the present invention is not inhibited. Examples of other reactive monomers include styrene, an ester of (meth)acrylic acid and an alcohol having 1 to 25 carbon atoms, and the like.

Examples of the ester of (meth)acrylic acid and an alcohol having 1 to 25 carbon atoms include methyl (meth)acrylate, ethyl (meth)acrylate, propyl (meth)acrylate, n-butyl (meth)acrylate, isobutyl (meth)acrylate, tert-butyl (meth)acrylate, pentyl (meth)acrylate, (cyclo)hexyl (meth)acrylate, heptyl (meth)acrylate, (iso)octyl (meth)acrylate, nonyl (meth)acrylate, (iso)decyl (meth)acrylate, norbornyl (meth)acrylate, isobornyl (meth)acrylate, adamantyl (meth)acrylate, lauryl (meth)acrylate, tetradecyl (meth)acrylate, (iso)stearyl (meth)acrylate, isobornyl (meth)acrylate, phenoxyethylene glycol (meth)acrylate, phenoxydiethylene glycol (meth)acrylate, 2-ethylhexyl (meth)acrylate, and the like.

Only one of other reactive monomers may be used, or two or more of other reactive monomers may be used together.

(c) Other Additives

The hollow particles may contain other additives such as a pigment particle (pigment), a dye, a stabilizer, an ultraviolet absorbing agent, an antifoaming agent, a thickener, a heat stabilizer, a leveling agent, a lubricant, and an antistatic agent according to necessity, in such a range that the effect of the present invention is not inhibited.

The pigment particle is not particularly limited, as long as it is a pigment particle which is used in the art. Examples thereof include particles of iron oxide-based pigments such as micaceous iron oxide and iron black; lead oxide-based pigments such as red lead and chrome yellow; titanium oxide-based pigments such as titan white (rutile-type titanium oxide), titan yellow, and titan black; cobalt oxide; zinc oxide-based pigments such as zinc yellow; molybdenum oxide-based pigments such as molybdenum red and molybdenum white. Only one of the pigment particles may be used, or two or more of the pigment particles may be used together.

For example, when the microcapsule particles are used for displaying background of an electrophoresis display device, since display of white background like a paper can be realized, as the pigment particle, particles of white pigments such as titan white and molybdenum white are preferably used. Since display of white background which is more excellent in whiteness can be realized, as the pigment particle, particles of titan white are more preferably used.

(Microcapsule Particles)

Microcapsule particles are particles encapsulating a solvent, inside the hollow particles. By dissolving or dispersing an active ingredient depending on use in a solvent, microcapsule particles encapsulating the active ingredient can be obtained.

(Method for Producing Microcapsule Particles and Hollow Particles)

In the conventional method for producing microcapsule particles and hollow particles, the shell is formed by polymerizing a reactive monomer once, and phase separation between an organic solvent (non-reactive solvent) and the shell is performed simultaneously with polymerization. The inventors of the present invention considered that, in this method, a step of simultaneously performing phase separation and polymerization causes generation of pinholes and deterioration in monodispersibility. In addition, the inventors considered that pinholes in the shell inhibit reduction in reflectivity of a film when the hollow particles are used as a low reflection material and reduction in heat conductivity of a film when the hollow materials are used as a heat conductivity adjusting agent. Thus, the inventors considered that if before phase separation of the non-reactive solvent, polymer particles are formed once, and thereafter, phase separation is caused, generation of pinholes can be suppressed, and monodispersibility can be improved, leading to the present invention.

Specifically, by polymerizing a reactive monomer having a radical polymerizable functional group and a non-radical polymerizable functional group based on any one of both functional groups, polymer particles are prepared. By mixing a non-reactive solvent with the reactive monomer in advance, or making the polymer particles absorb the non-reactive solvent after preparation of the polymer particles, the non-reactive solvent is made to be contained in the polymer particles. Then, by polymerization with the other remaining functional group of both functional groups, the polymer and the non-reactive solvent are phase-separated, thereby, microcapsule particles encapsulating the non-reactive solvent are obtained. Thereafter, by removing the non-reactive solvent, hollow particles are obtained.

On the other hand, in the methods described in Patent Documents 3 and 5, by suspending a reactive solution containing a reactive monomer and a non-reactive solvent in a polar solvent, and polymerizing the reactive monomer in oil droplets, microcapsule particles and hollow particles having the same size and shape as those of oil droplet are obtained. In this method, it was found that there are the following problems:

Generally, oil droplets easily become polydisperse, and the resulting microcapsule particles and hollow particles easily become polydisperse.

Since in order to prepare microcapsule particles and hollow particles having a smaller particle diameter, it was necessary to apply a great shearing stress to a suspension for a long time to reduce an oil droplet diameter, the time and the cost are required.

A polymer which has grown to a certain molecular weight in oil droplets is precipitated from the non-reactive solvent, and the precipitated polymers are laminated while moving to an oil-water interface, thereby, a shell of microcapsule particles or hollow particles is formed. For this reason, a gap is easily generated between the laminated polymers of the shell, and pinholes are easily opened in the shell.

To the contrary, in the production method of the present invention, by separating polymerization and phase separation, the method has the following advantages:

A gap between the polymers of the shell, which exists in the previous production method, becomes not to exist, and generation of pinholes in the shell of the resulting microcapsule particles and hollow particles can be suppressed.

Since a shape of the microcapsule particles and the hollow particles does not depend on oil droplets, but depends on a shape and a particle size distribution of polymer particles before phase separation, microcapsule particles and hollow particles having high monodispersibility are easily obtained.

In addition, in the production method of the present invention, microcapsule particles and hollow particles having an average particle diameter of 10 nm to 10 µm can be produced. When an average particle diameter is less than 10 nm, aggregation between the microcapsule particles and the hollow particles is generated, and handleability may be inferior. When an average particle diameter is greater than 10 nm, in the case where kneaded with a coating agent or a resin, irregularities of a surface become great, and design property may be deteriorated. An upper limit of a more preferable particle diameter is 3 µm, and an upper limit of a further preferable particle diameter is 1 µm.

The production method of the present invention will be illustrated below.

(A) Method for Producing Microcapsule Particles

The method for producing microcapsule particles comprises a step of preparing polymer particles containing a non-reactive solvent (polymerization step), and a step of phase-separating the non-reactive solvent from the polymer particles (phase-separation step).

(1) Polymerization Step

In the polymerization step, polymer particles are prepared by polymerizing a reactive monomer having a radical polymerizable functional group and a non-radical polymerizable functional group, based on any one of both functional groups. The non-reactive solvent is made to be contained in the polymer particles, by mixing the non-reactive solvent with the reactive monomer in advance, or making the polymer particles absorb the non-reactive solvent after preparation of the polymer particles.

It is preferable that a used amount of the reactive monomer having a radical polymerizable functional group and a non-radical polymerizable functional group is 10% by weight or more of the whole reactive monomer. When the used amount is less than 10% by weight, the reactive monomer may not be phase-separated from the non-reactive solvent well and thus become difficult to produce microcapsule particles. The used amount of the reactive monomer having a radical polymerizable functional group and a non-radical polymerizable functional group is more preferably 30% by weight or more, and further preferably 50% by weight or more.

Other additives such as a chain transfer agent, a pigment particle (pigment), a dye, a stabilizer, an ultraviolet absorbing agent, an antifoaming agent, a thickener, a heat stabilizer, a leveling agent, a lubricant, and an antistatic agent may be used according to necessity, in such a range that the effect of the present invention is not inhibited.

The chain transfer agent can be used at polymerization of the reactive monomer. The chain transfer agent is not particularly limited, but examples thereof include alkylmercaptans such as n-hexylmercaptan, n-octylmercaptan, tert-octylmercaptan, n-dodecylmercaptan, and tert-dodecylmercaptan; an α-methylstyrene dimer; phenol-based compounds such as 2,6-di-tert-butyl-4-methylphenol and styrenated phenol; allyl compounds such as allyl alcohol; and halogenated hydrocarbon compounds such as dichloromethane, dibromomethane, and carbon tetrachloride. Only one of the chain transfer agents may be used, or two or more of the chain transfer agents may be used together.

(a) Polymer Particles

As a method for preparing polymer particles, among the publicly-known methods such as a mass polymerization method, a solution polymerization method, a dispersion polymerization method, a suspension polymerization method, and an emulsion polymerization method, an arbitrary method can be adopted. Among them, a suspension polymerization method and an emulsion polymerization method by which polymer particles can be prepared relatively simply are preferable. Furthermore, an emulsion polymerization method by which polymer particles having high monodispersibility are easily obtained, is more preferable.

The polymer particles are obtained by polymerizing the radical polymerizable functional group or the non-radical polymerizable functional group.

In polymerization, it is preferable to add a compound which causes polymerization of a functional group to be polymerized.

(i) When the functional group to be polymerized is a radical polymerizable functional group, as this compound, a polymerization initiator can be used. The polymerization initiator is not particularly limited, but examples thereof include persulfates such as ammonium persulfate, potassium persulfate, and sodium persulfate; organic peroxides such as cumene hydroperoxide, di-tert-butyl peroxide, dicumyl peroxide, benzoyl peroxide, lauroyl peroxide, dimethylbis(tert-butylperoxy)hexane, (dimethylbis(tert-butylperoxy)hexyne-3, bis(tert-butylperoxyisopropyl)benzene, bis(tert-butylperoxy)trimethylcyclohexane, butyl-bis(tert-butylperoxy) valerate, tert-butyl 2-ethylperoxyhexanoate, dibenzoyl peroxide, paramenthane hydroperoxide, and tert-butyl peroxybenzoate; azo-based compounds such as 2,2-azobis[2-(2-imidazolin-2-yl)propane]dihydrochloride, 2,2-azobis[2-(2-imidazolin-2-yl)propane] disulfate dihydrate, 2,2-azobis(2-amidinopropane) dihydrochloride, 2,2-azobis[N-(2-carboxyethyl)-2-methylpropionamidine] hydrate, 2,2-azobis{2-[1-(2-hydroxyethyl)-2-imidazolin-2-yl]propane} dihydrochloride, 2,2-azobis[2-(2-imidazolin-2-yl)propane], 2,2-azobis(1-imino-1-pyrrolidino-2-ethylpropane) dihydrochloride, 2,2-azobis{2-methyl-N-[1,1-bis(hydroxymethyl)-2-hydroxyethyl] propionamide}, 2,2-azobis[2-methyl-N-(2-hydroxyethyl)propionamide], 4,4-azobis(4-cyanopentanoic acid), 2,2'-azobisisobutyronitrile(2,2'-azobis(2-methyl-butyronitrile)), 2,2'-azobis(2-isopropylbutyronitrile), 2,2'-azobis(2,3-dimethylbutyronitrile), 2,2'-azobis(2,4-dimethylbutyronitrile), 2,2'-azobis(2-methylcapronitrile), 2,2-azobis(2,3,3-trimethylbutyronitrile) 2,2'-azobis(2,4,4-trimethylvaleronitrile), 2,2'-azobis(2,4-dimethylvaleronitrile), 2,2'-azobis(2,4-dimethyl-4-ethoxyvaleronitrile), 2,2'-azobis(2,4-dimethyl-4-n-butoxyvaleronitrile), 2,2'-azobis(4-methoxy-2,4-dimethylvaleronitrile), 2,2'-azobis[N-(2-propenyl)-2-methylpropionamide], 2,2-azobis(N-butyl-2-methylpropionamide), 2,2'-azobis(N-cyclohexyl-2-methylpropionamide), 1,1-azobis(1-acetoxy-1-phenylethane), 1,1'-azobis(cyclohexane-1-carbonitrile), dimethyl-2,2'-azobis(2-methylpropionate), dimethyl-2,2'-azobisisobutyrate, dimethyl-2,2'-azobis(2-methylpropionate), 2-(carbamoylazo)isobutyronitrile, and 4,4'-azobis(4-cyanovaleric acid); and the like. Only one of the polymerization initiators may be used, or two or more of the polymerization initiators may be used together.

Furthermore, a redox initiator in which a polymerization initiator such as the persulfates and the organic peroxides, and a reducing agent such as sodium sulfoxylate formaldehyde, sodium hydrogen sulfite, ammonium hydrogen sulfite, sodium thiosulfate, ammonium thiosulfate, hydrogen peroxide, sodium hydroxymethanesulfinate, L-ascorbic acid and salts thereof, a cuprous salt, and a cupric salt are combined, may be used as the polymerization initiator.

When polymerization is emulsion polymerization, it is preferable that the polymerization initiator is a water-soluble polymerization initiator which can cause emulsion polymerization under a water solvent. The water-soluble polymerization initiator is not particularly limited, but examples thereof include persulfates such as ammonium persulfate, potassium persulfate, and sodium persulfate; and azo compounds such as 2,2-azobis[2-(2-imidazolin-2-yl)propane] dihydrochloride, 2,2-azobis[2-(2-imidazolin-2-yl)propane] disulfate dihydrate, 2,2-azobis(2-amidinopropane) dihydrochloride, 2,2-azobis[N-(2-carboxyethyl)-2-methylpropionamidine] hydrate, 2,2-azobis{2-[1-(2-hydroxyethyl)-2-imidazolin-2-yl]propane} dihydrochloride, 2,2-azobis[2-(2-imidazolin-2-yl)propane], 2,2-azobis(1-imino-1-pyrrolidino-2-ethylpropane) dihydrochloride, 2,2-azobis{2-methyl-N-[1,1-bis(hydroxymethyl)-2-hydroxyethyl] propionamide}, 2,2-azobis[2-methyl-N-(2-hydroxyethyl) propionamide], and 4,4-azobis(4-cyanopentanoic acid).

(ii) When the functional group to be polymerized is a non-radical polymerizable functional group, as this compound, the crosslinking agent can be used. When the non-radical polymerizable functional group is a self-crosslinking group, it is not necessary to use the crosslinking agent.

(iii) The polymer particles are preferably such that the radical polymerizable functional group is polymerized earlier, and the particles have an unreacted non-radical polymerizable functional group in a polymer. When the non-radical polymerizable functional group is polymerized earlier, it may become difficult to absorb a non-reactive solvent.

It is preferable that, by polymerizing a polymerizable functional group of one of the radical polymerizable functional group and the non-radical polymerizable functional group, the polymer particles have an unreacted the other polymerizable functional group in the polymer. However, even if an entire amount of the functional group which is polymerized at preparation of the polymer particles is not polymerized, or is partially polymerized, there is no serious problem, and even if a part of the other polymerizable functional group is polymerized, there is no serious problem. For example, when a radical polymerizable functional group of glycidyl methacrylate is polymerized to prepare polymer particles having an epoxy group, an unreacted radical polymerizable functional group may remain, or an epoxy group may undergo a partial ring-opening reaction (in other words, an epoxy group at an amount that allows phase separation remains in the polymer particles).

(b) Absorption of Non-Reactive Solvent

Absorption of the non-reactive solvent into the polymer particles can be performed at production of or after production of the polymer particles. In addition, absorption of the non-reactive solvent can be performed in the presence or absence of a dispersing medium incompatible with the non-reactive solvent. It is preferable that absorption is performed in the presence of the dispersing medium, because absorption of the non-reactive solvent can be effectively performed. When a medium is used in the method for producing polymer particles, the medium may be used as it is as the dispersing medium, or after the polymer particles are separated from the medium once, they may be dispersed in the dispersing medium.

By adding a non-reactive solvent incompatible with the dispersing medium to the dispersing medium containing the polymer particles, followed by stirring or the like for a certain time, the non-reactive solvent can be absorbed into the polymer particles.

Alternatively, absorption of the non-reactive solvent at production of the polymer particles can be realized by selecting a dispersing medium and a non-reactive solvent which are suitable for producing the polymer particles. For example, when the polymer particles are produced by emulsion polymerization under a water solvent, production of the polymer particles and absorption into the polymer particles can be performed simultaneously, by adding a non-reactive solvent incompatible with water to a water solvent in advance, and polymerizing a reactive monomer. When production of the polymer particles and absorption into the polymer particles are performed simultaneously, a necessary time for absorbing the non-reactive solvent can be saved.

(i) Dispersing Medium

The dispersing medium is not particularly limited, as long as it is a liquid substance which does not, completely dissolve the polymer particles. Examples thereof include water; alcohols such as ethanol, methanol, and isopropyl alcohol; alkanes such as butane, pentane, hexane, cyclohexane, heptane, decane, and hexadecane; aromatic hydrocarbons such as toluene and xylene; ester-based solvents such as ethyl acetate and butyl acetate; ketone-based solvents such as methyl ethyl ketone and methyl isobutyl ketone; halogen-based solvents such as methyl chloride, methylene chloride, chloroform, and carbon tetrachloride. Only one of them may be used, or two or more of them may be used together.

(ii) Non-Reactive Solvent

The non-reactive solvent is not particularly limited, as long as it is a liquid incompatible with the dispersing medium. Herein, incompatible with the dispersing medium is that solubility (at 25° C.) of the non-reactive solvent in the dispersing medium is 10% by weight or less. When water is used as the dispersing medium, examples of a usable non-reactive solvent include butane, pentane, hexane, cyclohexane, heptane, decane, hexadecane, toluene, xylene, ethyl acetate, butyl acetate, methyl ethyl ketone, methyl isobutyl ketone, 1,4-dioxane, methyl chloride, methylene chloride, chloroform, carbon tetrachloride, and the like. Only one of them may be used, or two or more of them may be used together.

An addition amount of the non-reactive solvent is not particularly limited, but is 20 to 5,000 parts by weight based on 100 parts by weight of the polymer particles. When the addition amount is less than 20 parts by weight, a hollow portion of the resulting microcapsule particles and hollow particles becomes small, and desired properties may not be obtained. When the addition amount exceeds 5,000 parts by weight, a hollow portion becomes too large, and the strength of the resulting microcapsule particles and hollow particles may be reduced. The addition amount can take 20 parts by weight, 100 parts by weight, 500 parts by weight, 1,000 parts by weight, 2,000 parts by weight, 4,000 parts by weight, and 5,000 parts by weight.

(2) Phase-Separation Step

Then, the remaining polymerizable functional group is polymerized to phase-separate the polymer and the non-reactive solvent. By phase separation, microcapsule particles encapsulating the non-reactive solvent are obtained.

As the compound to be added, which causes polymerization of the remaining polymerizable functional group, the same polymerization initiators for polymerizing the radical polymerizable functional group, and crosslinking agents for polymerizing the non-radical polymerizable functional group as those described for the polymerization step can be used.

By optionally replacing the non-reactive solvent encapsulated in the microcapsule particles, microcapsule particles encapsulating a solvent different from the non-reactive solvent in a hollow portion can be obtained. For examples, by adding an appropriate dispersing medium to the microcapsule particles encapsulating the non-reactive solvent, or a dispersion thereof, and performing stirring or the like, the non-reactive solvent inside the particles is replaced with a dispersing medium. Thereafter, by removing an excessive non-reactive solvent and dispersing medium by a reduced pressure drying method, a centrifugal separation method, an ultrafiltration method or the like, the non-reactive solvent can be replaced. Solvent replacement may be performed only once, or may be performed plural times. Specifically, when solvent replacement is performed with ethanol, microcapsule particles encapsulating ethanol can be prepared.

(B) Method for Producing Hollow Particles

Hollow particles in which a hollow is filled with a gas can be produced, for example, via a step of removing a non-reactive solvent in the microcapsule particles (solvent removal step), without particular limitation.

A method of removing the non-reactive solvent is not particularly limited, but examples thereof include a reduced pressure drying method and the like. Examples of the condition for a reduced pressure drying method include a pressure of 500 Pa or lower, 30 to 200° C., and 30 minutes to 50 hours.

(1) Solvent Dispersion

The hollow particles may be used, as needed, as a dispersion of the hollow particles in a solvent. For example, the hollow particles may be used in the state of a dispersion of the microcapsule particles encapsulating the non-reactive solvent, which is obtained after a phase separation step, or may be used as a solvent dispersion, in which the non-reactive solvent is replaced with other dispersing solvent.

(2) Dried Powder

The hollow particles may be used, as needed, as dried powders obtained by drying the solvent dispersion of the hollow particles. A method of drying the hollow particles is not particularly limited, but examples thereof include a reduced pressure drying method and the like. In addition, in the dried powder, the dispersing solvent or the non-reactive solvent which remained without being dried, may remain.

(Use of Microcapsule Particles)

The microcapsule particles can be used in use such as electrophoresis particles of an electrophoretic display device or particles which display background, drug delivery particles, particles for cosmetics or the like.

(Use of Hollow Particles)

The hollow particles are useful as an additive of a coating agent (composition for coating) used in a paint, a paper, an information recording paper, a light diffusing film (optical sheet), a light guiding ink, an antireflection film, a light extraction film or the like, that is use for which reflectivity is desired to be adjusted, an additive of a master pellet for forming a molded article such as a light diffusing plate, and a light guiding plate, or an additive of cosmetics. The hollow particles are also useful as an additive of a paint, a paper, an information recording paper, a heat insulating film, and a thermoelectric conversion material, that is use for which adjustment of heat conductivity is desired.

(a) Coating Agent

The coating agent contains at least the hollow particles. The coating agent may contain an optional binder.

The binder is not particularly limited, but the publicly-known hinder resin can be used. Examples of the binder resin include a thermosetting resin, a thermoplastic resin, and the like, more specifically, a fluorine-based resin, a polyamide resin, an acrylic resin, a polyurethane resin, an acrylic urethane resin, a butyral resin, and the like. These binder resins may be used alone, or two or more of them may be used by mixing them. Alternatively, a polymerizable monomer may also be used as the binder.

Examples of the polymerizable monomer include:

monofunctional polymerizable monomers such as an ester of (meth)acrylic acid and an alcohol having 1 to 25 carbon atoms, such as methyl (meth)acrylate, ethyl (meth)acrylate, propyl (meth)acrylate, n-butyl (meth)acrylate, isobutyl (meth)acrylate, tert-butyl (meth)acrylate, pentyl (meth)acrylate, (cyclo)hexyl (meth)acrylate, heptyl (meth)acrylate, (iso)octyl (meth)acrylate, nonyl (meth)acrylate, (iso)decyl (meth)acrylate, norbornyl (meth)acrylate, isobornyl (meth) acrylate, adamantyl (meth)acrylate, lauryl (meth)acrylate, tetradecyl (meth)acrylate, (iso)stearyl (meth)acrylate, isobornyl (meth)acrylate, phenoxyethylene glycol (meth) acrylate, phenoxydiethylene glycol (meth)acrylate, and 2-ethylhexyl (meth)acrylate;

polyfunctional polymerizable monomers such as trimethylolpropane tri(methacrylate, tripropylene glycol di(meth) acrylate, diethylene glycol di(meth)acrylate, dipropylene glycol di(meth)acrylate, pentaerythritol tri(meth)acrylate, pentaerythritol tetra(meth)acrylate, dipentaerythritol hexa (meth)acrylate, 1,6-hexanediol di(meth)acrylate, neopentyl glycol di(meth)acrylate, trimethylolpropane tri(meth)acrylate, ditrimethylolpropane tetra(meth)acrylate, dipentaerythritol penta(meth)acrylate, tripentaerythritol octa(meth)acrylate, tetrapentaerythritol deca(meth)acrylate, isocyanuric acid tri(meth)acrylate, isocyanuric acid di(meth)acrylate, polyester tri(meth)acrylate, polyester di(meth)acrylate, bisphenol di(meth)acrylate, diglycerin tetra(meth)acrylate, adamantyl di(meth)acrylate, isobornyl di(meth)acrylate, dicyclopentane di(meth)acrylate, tricyclodecane di(meth) acrylate, and ditrimethylolpropane tetra(meth)acrylate.

Furthermore, when these polymerizable monomers are used, a polymerization initiator which initiates a curing reaction by ionizing radiation may be used. Examples thereof include an imidazole derivative, a bisimidazole derivative, an N-arylglycine derivative, an organic azide compound, titanocenes, an aluminate complex, an organic peroxide, an N-alkoxypyridinium salt, a thioxanthone derivative, and the like.

Furthermore, as the binder, for example, an inorganic binder such as a hydrolysate of silicon alkoxides, and the like can also be used. Examples of the silicon alkoxide include tetramethoxysilane, tetraethoxysilane, methyltrimethoxysilane, methyltriethoxysilane, 3-aminopropyltrimethoxysilane, 3-aminopropyltriethoxysilane, 2-hydroxyethyltrimethoxysilane, 2-hydroxyethyltriethoxysilane, 2-hydroxypropyltrimethoxysilane, 2-hydroxypropyltriethoxysilane, 3-hydroxypropyltrimethoxysilane, 3-hydroxypropyltriethoxysilane, vinyltrimethoxysilane, vinyltriethoxysilane, vinyltriacetoxysilane, allyltrimethoxysilane, 3-acryloxypropyltrimethoxysilane, 3-methacryloxypropylmethyldimethoxysilane, 3-methacryloxytrimethoxysilane, 3-methacryloxypropylmethyldiethoxysilane, 3-methacryloxypropyltriethoxysilane, 3-mercaptopropyltrimethoxysilane, 3-mercaptopropylmethyldimethoxysilane, 3-mercaptopropyltriethoxysilane, 3-isocyanatopropyltrimethoxysilane, 3-isocyanatopropyltriethoxysilane, 3-glycidoxypropyltrimethoxysilane, 3-glycidoxypropyltriethoxysilane, 2-(3,4-epoxycyclohexyl)ethyltrimethoxysilane, 2-(3,4-epoxycyclohexyl)ethyltriethoxysilane, 3-(meth)acryloxypropyltriemthoxysilane, 3-(meth)acryloxypropyltriethoxysilane, 3-ureidopropyltrimethoxysilane, 3-ureidopropyltriethoxysilane, dimethyldimethoxysilane, dimethyldiethoxysilane, diethyldimethoxysilane, and diethyldiethoxysilane.

Examples of the publicly-known binder product include DIANAL LR-102 and DIANAL BR-106 manufactured by Mitsubishi Rayon Co., Ltd., and the like.

The content of the hollow particles in the coating agent is appropriately adjusted depending on utility to be used, and the hollow particles can be used in the range of 0.1 to 1,000 parts by weight based on 100 parts by weight of the binder.

A dispersing medium is usually contained in the coating agent. As the dispersing medium, any of aqueous and oleaginous media can be used. Examples of the oleaginous medium include hydrocarbon solvents such as toluene and xylene; ketone solvents such as methyl ethyl ketone and methyl isobutyl ketone; ester solvents such as ethyl acetate and butyl acetate; ether solvents such as dioxane and ethylene glycol diethyl ether; and the like. Examples of the aqueous medium include water and alcohol solvents.

Furthermore, other additives such as a curing agent, a coloring agent, an antistatic agent, and a leveling agent may be contained in the coating agent.

A substrate to be coated of the coating agent is not particularly limited, but substrates depending on use can be used. For example, in optical use, transparent substrates such as a glass substrate and a transparent resin substrate can be used.

(b) Master Pellet

The master pellet comprises the hollow particles and a substrate resin.

The substrate resin is not particularly limited, as long as it is a normal thermoplastic resin, but examples thereof include a (meth)acryl resin, an alkyl (meth)acrylate-styrene copolymer resin, a polycarbonate resin, a polyester resin, a polyethylene resin, a polypropylene resin, a polystyrene resin, and the like. When transparency is particularly required, a (meth)acryl resin, an alkyl (meth)acrylate-styrene copolymer resin, a polycarbonate resin, and a polyester resin are appropriate. These substrate resins can be used alone, or can be used by combining two or more of them. In addition, the substrate resin may contain a slight amount of additives such as an ultraviolet absorbing agent, a heat stabilizer, a coloring agent, and a filler.

The master pellet can be produced by melt-kneading the hollow particles and the substrate resin, and molding the kneading product by a molding method such as extrusion molding and injection molding. A blending ratio of the hollow particles in the master pellet is not particularly limited, but is preferably around 0.1 to 60% by weight, more preferably around 0.3 to 30% by weight, and further preferably around 0.4 to 10% by weight. When the blending ratio is more than 60% by weight, it may become difficult to produce the master pellet. On the other hand, when the blending ratio is less than 0.1% by weight, the effect of the present invention may be deteriorated.

The master pellet becomes a molded article by performing, for example, extrusion molding, injection molding or press molding. In addition, upon molding, the substrate resin may be newly added. It is appropriate to add the substrate resin at such an amount that a blending ratio of the hollow particles contained in the finally obtained molded article becomes around 0.1 to 60% by weight. In addition, at molding, additives such as an ultraviolet absorbing agent, a heat stabilizer, a coloring agent, and a filler may be added at a slight amount.

(c) Cosmetics

Examples of specific cosmetics into which the hollow particles can be blended, include solid cosmetics such as face powder and foundation; powdery cosmetics such as baby powder and body powder; liquid cosmetics such as skin lotion, milky lotion, cream, and body lotion; and the like.

A ratio of blending the hollow particles into these cosmetics is also different depending on a kind of the cosmetics. For example, in the case of solid cosmetics such as face powder and foundation, a blending ratio is preferably 1 to 20% by weight, and particularly preferably 3 to 15% by weight. Additionally, in the case of powdery cosmetics such as baby powder and body powder, a blending ratio is preferably 1 to 20% by weight, and particularly preferably 3 to 15% by weight. Furthermore, in the case of liquid cosmetics such as skin lotion, milky lotion, cream, liquid foundations, body lotion, and preshaving lotion, a blending ratio is preferably 1 to 15% by weight, and particularly preferably 3 to 10% by weight.

In addition, in order to improve the optical function and improving touch sensation, coloring pigments such as inorganic compounds such as mica and talc, iron oxide, titanium oxide, ultramarine, Prussian blue, and carbon black; or synthetic dyes such as azo-based dyes can be added to these cosmetics. In the case of liquid cosmetics, a liquid medium is not particularly limited, but water, alcohols, hydrocarbons, silicone oils, vegetable or animal fats and oils, and the like can also be used. In addition to the aforementioned other ingredients, a moisturizing agent, an anti-inflammatory agent, a whitening agent, a UV care agent, a bactericide, an antiperspirant, a refrigerant, a perfume, and the like, which are generally used in cosmetics, can be added to these cosmetics, thereby, various functions can also be added.

(d) Antireflection Film

The antireflection film contains at least the hollow particles. In film or sheet-shaped products containing the hollow particles, since a refractive index is reduced due to an air layer inside the hollow particles, the products can be used as the antireflection film. Additionally, since the hollow particles have high heat resistance, the antireflection film having high heat resistance is obtained. The antireflection film can be obtained by coating the coating agent on a substrate by the well-known method such as a dipping method, a spraying method, a spin coating method, a spinner method, and a roll coating method, drying the substrate, further according to necessity, heating, ultraviolet-irradiating, and baking the substrate.

(e) Substrate with Antireflection Film

The substrate with an antireflection film is such that the antireflection film is formed on a surface of a substrate such as a glass, a plastic sheet, a plastic film, a plastic lens, and a plastic panel of a polycarbonate, an acrylic resin, PET, TAC or the like, a substrate of a cathode ray tube, a fluorescent display tube, a liquid crystal display plate, or the like. Varying depending on use, a coat is formed on a substrate, alone or in combination with a protective film, a hard coat film, a flattening film, a high refractive index film, an insulating film, an electrically conductive resin film, an electrically conductive metal fine particle film, an electrically conductive metal oxide fine particle film, other optionally used primer film, and the like. In addition, when used in combination, it is not necessarily required that the antireflection film is formed on an outermost surface.

(f) Light Extraction Film

The light extraction film contains at least the hollow particles. In LED or organic EL illumination, since a difference in a refractive index between an air layer and a light emitting layer is great, emitted light is easily confined inside an element. For this reason, the light extraction film is used for the purpose of improving a light emitting efficiency. The film or sheet-shaped products containing the hollow particles can be used as the light extraction film, because a refractive index is reduced due to an air layer inside the hollow particles. In addition, since the hollow particles have high heat resistance, the light extraction film having high heat resistance is obtained. The light extraction film can be obtained by coating the coating agent on a substrate by the well-known method such as a dipping method, a spraying method, a spin coating method, a spinner method, and a roll coating method, drying the substrate, further according to necessity, heating, ultraviolet-irradiating, and baking the substrate.

(g) Substrate with Light Extraction Film

The film with a light extraction film is such that the light extraction film is formed on a surface of a substrate such as a glass, a plastic sheet, a plastic film, a plastic lens, and a plastic panel of a polycarbonate, an acrylic resin, PET, TAC or the like, or a substrate of a cathode ray tube, a fluorescent display tube, a liquid crystal display plate or the like. Varying depending on use, a coat is formed on a substrate, alone or in combination with a protective film, a hard coat film, a flattening film, a high refractive index film, an insulating film, an electrically conductive resin film, an electrically conductive metal fine particle film, an electrically conductive metal oxide fine particle film, other optionally used primer film, and the like. In addition, when used in combination, it is not necessarily required that the light extraction film is formed on an outermost surface.

(h) Heat Insulating Film

The heat insulating film contains at least the hollow particles. Since film or sheet-shaped products containing the hollow particles have an air layer inside the hollow particles, they can be used as the heat insulating film. In addition, since a particle diameter of the hollow particles is small, the heat insulating film having high transparency is obtained, and since a binder enters a hollow portion with difficulty, the heat insulating film having high heat insulating property is easily obtained. The heat insulating film can be obtained by coating the coating agent on a substrate by the well-known method such as a dipping method, a spraying method, a spin coating method, a spinner method, and a roll coating method, drying the substrate, and further according to necessity, heating, ultraviolet-irradiating, and baking the substrate.

EXAMPLES

The present invention will be further specifically illustrated below by way of Examples, but the present invention is not limited by them at all.

First Example

First, details of various measurement methods used in First Example will be described below.

(Average Particle Diameter, Hollow Rate, CV Value)

An average particle diameter, a hollow rate, and a CV value of the hollow particles are measured as described below.

That is, a 10 wt % dispersion of hollow particles in methanol is dried for 4 hours in a vacuum dryer at 60° C. to obtain a dried powder. A TEM photograph of the hollow particles is taken at magnification of about 300,000, under the condition of an acceleration voltage of 80 kV, using a transmission electron microscope (H-7600 manufactured by Hitachi High-Technologies Corporation). A particle diameter and an internal diameter of optional 100 or more particles taken on this photograph are observed. At this time, by measuring and averaging a particle diameter and an internal diameter of 5 or more particles so that a center of the particles is passed, an average particle diameter and an average internal diameter are obtained. Furthermore, a hollow rate of the hollow particles is obtained by the equation of (average internal diameter)$^3$/(average particle diameter)$^3 \times 100$.

In addition, concerning a variation coefficient (CV value) of a particle diameter of the hollow particles, a standard deviation and an average particle diameter of the particle diameter are obtained, and further, a value obtained by the equation of (standard deviation)/(average particle diameter)$\times 100$ is adopted as a CV value of the hollow particles.

(Reflectivity)

Reflectivity of a film using the hollow particles is measured as follows:

That is, 20 parts by weight of a 10 wt % dispersion of the hollow particles in methanol, 4 parts by weight of dipentaerythritol polyacrylate (NK Ester A-9570W manufactured by SHIN-NAKAMURA CHEMICAL CO., LTD.), 0.20 parts by weight of a photopolymerization initiator (IRGACURE 1173 manufactured by BASF), and 0.50 parts by weight of a polyether phosphoric acid ester-based surfactant (Solsperse 41000 manufactured by Lubrizol Japan Limited) are mixed, and the mixture is forcibly stirred for 5 minutes using an ultrasound homogenizer (Model SONIFIER 450, manufactured by BRANSON) to obtain a mixed solution. 0.5 ml of the mixed solution is added dropwise to a slide glass (S1111 manufactured by Matsunami Glass Ind., Ltd.), and the solution is coated using a spin coater (Model K-359SD1, manufactured by Kyowa Riken, Co., Ltd.) to obtain a coated film. The resulting coated film is dried at room temperature (about 25° C.) under a normal pressure. The dried coated film is passed through an ultraviolet ray irradiation device (J-Cure manufactured by JATEC, Model JU-C1500, drawing speed: 0.4 m/min, peak illuminance: 125 mW/cm$^2$) three times to cure, thereby, a film is prepared.

Reflectivity from a film upper side under a light source 550 nm and an incident angle 8° is measured using an ultraviolet and visible spectrophotometer (Model UV-2450, manufactured by Shimadzu Corporation) equipped with an integrating sphere (Model ISR-2200, manufactured by Shimadzu Corporation).

In addition, assessment of reflection of a film is such that, when reflection is 8.0% or less, this is assessed to be ◯, and when reflectivity is greater than 8.0%, this is assessed to be x. In addition, reflectivity of only a slide glass is 8.4%, and reflectivity of a film made of only dipentaerythritol polyacrylate with no hollow particles added thereto is 8.3%.

(5% Degradation Initiation Temperature/Heat Resistance)

A 5% degradation initiation temperature of the hollow particles is measured as follows.

That is, a 10 wt % dispersion of the hollow particles in methanol is dried for 4 hours with a vacuum dryer at 60° C. to obtain a dried powder. A weight decrease behavior in the temperature range of 100 to 800° C. of the resulting hollow particles is measured in the nitrogen atmosphere at a nitrogen flow rate of 200 ml/min and a temperature rising rate of 10° C./min, using a TG/DTA device (TG/DTA6200 manufactured by Seiko Instruments Inc.). A temperature at which a heating decrease amount is 5% is adopted as a 5% degradation initiation temperature.

Example 1A

Into a 1 L reactor equipped with a stirrer and a thermometer were placed 35 parts by weight of glycidyl methacrylate, 5 parts by weight of 3-methacryloxypropyltriethoxysilane, 0.8 parts by weight of n-octylmercaptan, and 40 parts by weight of butyl acetate, followed by mixing. Then, an aqueous phase obtained by dissolving 1.6 parts by weight of sodium p-styrenesulfonate, and 0.4 parts by weight of ammonium persulfate in 720 parts by weight of ion-exchanged water was added. By heating the mixed solution at 70° C. for 10 hours while stirring, polymer particles having a remaining epoxy group were obtained. Since butyl acetate was added to emulsion polymerization, the polymer particles having a remaining epoxy group were swollen with butyl acetate.

Then, in order to polymerize the remaining epoxy group, 20 parts by weight of ethylenediamine was added, and polymerization was performed at 70° C., for 24 hours. Due to a reaction of the epoxy group in the polymer particles, the polymer and butyl acetate were phase-separated to obtain a dispersion of microcapsule particles. The resulting dispersion was washed with methanol three times, removal of butyl acetate in the inside and washing of an unnecessary part were performed, and thereafter, methanol was appropriately added so that the solid content became 10% by weight, and a 10 wt % dispersion of hollow particles in methanol was obtained.

The resulting hollow particles had an average particle diameter of 87 nm, and a CV value of 14%, and were the hollow particles having high monodispersibility. In addition, a hollow rate was as high as 35%. When the resulting hollow particles were used to prepare a film, and reflectivity was measured, reflectivity was 7.5%, and low reflection property was excellent. Furthermore, a 5% degradation initiation temperature was as high as 286° C., and the hollow particles were excellent in heat resistance.

Example 2A

In the same production method as in Example 1A except that an addition amount of glycidyl methacrylate was changed to 39 parts by weight, an addition amount of 3-methacryloxypropyltriethoxysilane was changed to 1 part by weight, and butyl acetate was changed to toluene, particles were obtained.

The resulting hollow particles had an average particle diameter of 91 nm and a CV value of 12%, and were the hollow particles having high monodispersibility. In addition, a hollow rate was as high as 33%. When the resulting hollow particles were used to prepare a film, and reflectivity was measured, reflectivity was 7.7%, and low reflection property was excellent. Furthermore, a 5% degradation initiation temperature was as high as 281° C., and the hollow particles were excellent in heat resistance.

Example 3A

In the same production method as in Example 1A except that an addition amount of glycidyl methacrylate was changed to 30 parts by weight, and 5 parts by weight of jER828 (manufactured by Mitsubishi Chemical Corporation, bisphenol A-type liquid epoxy resin, epoxy equivalent 184 to 194) was further added, particles were obtained.

The resulting hollow particles had an average particle diameter of 75 nm and a CV value of 15%, and were the hollow particles having high monodispersibility. In addition, a hollow rate was as high as 32%. When the resulting hollow particles were used to prepare a film, and reflectivity was measured, reflectivity was 7.8%, and low reflection property was excellent. Furthermore, a 5% degradation initiation temperature was as high as 291° C., and the hollow particles were excellent in heat resistance.

Example 4A

In the same production method as in Example 1A except that glycidyl methacrylate was changed to 25 parts by weight of 3,4-epoxycyclohexylmethyl acrylate, 3-methacryloxypropyltriethoxysilane was changed to 15 parts by weight of 3-methacryloxypropylmethyldiethoxysilane, and an addition amount of butyl acetate was changed to 50 parts by weight, particles were obtained.

The resulting hollow particles had an average particle diameter of 105 nm and a CV value of 19%, and were the hollow particles having high monodispersibility. In addition, a hollow rate was as high as 36%. When the resulting hollow particles were used to prepare a film, and reflectivity was measured, reflectivity was 7.2%, and low reflection property was excellent. Furthermore, a 5% degradation initiation temperature was as high as 301° C., and the hollow particles were excellent in heat resistance.

Example 5A

In the same production method as in Example 1A except that an addition amount of glycidyl methacrylate was changed to 35 parts by weight, 5 parts by weight of methyl methacrylate was further added, an addition amount of ethylenediamine was changed to 15 parts by weight, an addition amount of butyl acetate was changed to 35 parts by weight, and 5 parts by weight of N-2-(aminoethyl)-3-aminopropyltrimethoxysilane was further added, particles were obtained.

The resulting hollow particles had an average particle diameter of 95 nm and a CV value of 14%, and were the hollow particles having high monodispersibility. In addition, a hollow rate was as high as 36%. When the resulting hollow particles were used to prepare a film, and reflectivity was measured, reflectivity was 7.4%, and low reflection property was excellent. Furthermore, a 5% degradation initiation temperature was as high as 309° C., and the hollow particles were excellent in heat resistance.

Comparative Example 1A

Into a 1 L reactor equipped with a stirrer and a thermometer were placed 40 parts by weight of jER828, 50 parts by weight of toluene, and 10 parts by weight of hexadecane, followed by mixing. The resulting mixture was mixed with 720 parts by weight of ion-exchanged water containing 0.8 parts by weight of sodium dodecylbenzenesulfonate as a surfactant, and the mixture was forcibly stirred with an ultrasound homogenizer (Model SONIFIER 450, manufactured by BRANSON) for 1 hour under an ice bath to obtain a mixed solution, 15 parts by weight of ethylenediamine and 5 parts by weight of N-2-(aminoethyl)-3-aminopropyltrimethoxysilane were added, and polymerization was performed at 70° C., for 24 hours. The resulting dispersion was washed with methanol three times, removal of butyl acetate in the inside and washing of an unnecessary part were performed, and thereafter, methanol was appropriately added so that the solid content became 10% by weight, and a 10 wt % dispersion of hollow particles in methanol was obtained.

The resulting hollow particles had an average particle diameter of 101 nm and a CV value of 45%, and were the polydisperse hollow particles. In addition, a hollow rate was as high as 33%. When the resulting hollow particles were used to prepare a film, and reflectivity was measured, reflectivity was as high as 8.2%. Furthermore, a 5% degradation initiation temperature was as low as 145° C., and the hollow particles were inferior in heat resistance.

The following Table 1 summarizes raw materials used in production of the hollow particles and physical properties.

TABLE 1

| | | | | Example | | | | | Comparative Example |
|---|---|---|---|---|---|---|---|---|---|
| | | | Unit | 1A | 2A | 3A | 4A | 5A | 1A |
| Raw material | Reactive monomer | Glycidyl methacrylate | Parts by weight | 35 | 39 | 30 | — | 35 | — |
| | | 3,4-Epoxycyclohexylmethyl acrylate | Parts by weight | — | — | — | 25 | — | — |
| | | jER828 | Parts by weight | — | — | 5 | — | — | 40 |
| | | 3-Methacryloxypropyltriethoxysilane | Parts by weight | 5 | 1 | 5 | — | 5 | — |
| | | 3-Methacryloxypropylmethyldiethoxysilane | Parts by weight | — | — | — | 15 | — | — |
| | | Methyl methacrylate | Parts by weight | — | — | — | — | 5 | — |
| | Crosslinking agent | Ethylenediamine | Parts by weight | 20 | 20 | 20 | 20 | 15 | 15 |
| | | N-2-(aminoethyl)-3-aminopropyltrimethoxysilane | Parts by weight | — | — | — | — | 5 | 5 |
| | Chain transfer agent | n-Octylmercaptan | Parts by weight | 0.8 | 0.8 | 0.8 | 0.8 | 0.8 | — |
| | Polymerization initiator | Ammonium persulfate | Parts by weight | 0.4 | 0.4 | 0.4 | 0.4 | 0.4 | — |
| | Non-reactive solvent | Butyl acetate | Parts by weight | 40 | — | 40 | 50 | 35 | — |
| | | Toluene | Parts by weight | — | 40 | — | — | — | 50 |
| | | Hexadecane | Parts by weight | — | — | — | — | — | 10 |
| | Dispersing aid | Sodium p-styrenesulfonate | Parts by weight | 1.6 | 1.6 | 1.6 | 1.6 | 1.6 | — |
| | | Sodium dodecylbenzenesulfonate | Parts by weight | — | — | — | — | — | 0.8 |

TABLE 1-continued

|  |  | Unit | Example 1A | Example 2A | Example 3A | Example 4A | Example 5A | Comparative Example 1A |
|---|---|---|---|---|---|---|---|---|
| Assessment | Average particle diameter | nm | 87 | 91 | 75 | 105 | 95 | 101 |
|  | Hollow rate | % | 35 | 33 | 32 | 36 | 36 | 33 |
|  | CV value | % | 14 | 12 | 15 | 19 | 14 | 45 |
|  | 5% degradation initiation temperature/determination | ° C./ | 286/∘ | 281/∘ | 291/∘ | 301/∘ | 309/∘ | 145/x |
|  | Reflectivity/determination | %/ | 7.5/∘ | 7.7/∘ | 7.8/∘ | 7.2/∘ | 7.4/∘ | 8.2/x |

A photograph of the hollow particles of Example 1A is shown in FIG. 1.

By comparison between Examples 1A to 5A and Comparative Example 1A in Table 1, it was seen that the hollow particles which have a small particle diameter and high monodispersibility, and are suitable for preparing a film having low reflectivity can be produced.

Example 6A (Antireflection Film•Substrate with Antireflection Film)

20 parts by weight of the 10 wt % dispersion of the hollow particles in methanol prepared in Example 1A, 4 parts by weight of dipentaerythritol polyacrylate (NK Ester A-9570W manufactured by SHIN-NAKAMURA CHEMICAL CO., LTD.), 0.20 parts by weight of a photopolymerization initiator (IRGACURE 1173 manufactured by BASF), and 0.50 parts by weight of a polyether phosphoric acid ester-based surfactant (Solsperse 41000 manufactured by Lubrizol Japan Limited) were mixed, and the mixture was forcibly stirred for 5 minutes using an ultrasound homogenizer (Model SONIFIER 450, manufactured by BRANSON) to obtain a coating agent. 0.5 ml of the coating agent was added dropwise to a slide glass (S1111 manufactured by Matsunami Glass Ind., Ltd.), and the coating agent was coated using a spin coater (Model K-359SD1, manufactured by Kyowa Riken, Co., Ltd.) to obtain a coated film. The resulting coated film was dried at room temperature (about 25° C.) under a normal pressure. The dried coated film was passed through an ultraviolet ray irradiation device (J-Cure manufactured by JATEC, Model JUC1500, drawing speed: 0.4 m/min, peak illuminance: 125 mW/cm$^2$) three times to cure, thereby, a substrate with an antireflection film in which an antireflection film is formed on a glass substrate was prepared. Reflectivity of the substrate with an antireflection film was 7.5%, and was lower than reflectivity (8.4%) of a slide glass with no antireflection film, and antireflection property was excellent. Herein, a method of measuring reflectivity was the same as the aforementioned measurement method for the hollow particles.

Example 7A (Light Extraction Film•Substrate with Light Extraction Film)

20 parts by weight of the 10 wt % dispersion of the hollow particles in methanol prepared in Example 1A, 4 parts by weight of dipentaerythritol polyacrylate (NK Ester A-9570W manufactured by SHIN-NAKAMURA CHEMICAL CO., LTD.), 0.20 parts by weight of a photopolymerization initiator (IRGACURE 1173 manufactured by BASF), and 0.50 parts by weight of a polyether phosphoric acid ester-based surfactant (Solsperse 41000 manufactured by Lubrizol Japan Limited) were mixed, and the mixture was forcibly stirred for 5 minutes using an ultrasound homogenizer (Model SONIFIER 450, manufactured by BRANSON) to obtain a coating agent. 0.5 ml of the coating agent was added dropwise to a slide glass (S1111 manufactured by Matsunami Glass Ind., Ltd.), and the coating agent was coated using a spin coater (Model K-359SD1, manufactured by Kyowa Riken, Co., Ltd.) to obtain a coated film. The resulting coated film was dried at room temperature (about 25° C.) under a normal pressure. The dried coated film was passed through an ultraviolet ray irradiation device (J-Cure manufactured by JATEC, Model JUC1500, drawing speed: 0.4 m/min, peak illuminance: 125 mW/cm$^2$) three times to cure, thereby, a substrate with a light extraction film in which a light extraction film is formed on a glass substrate was prepared.

When a total light transmittance of the substrate with a light extraction film was measured using a haze meter, a total light transmittance of the substrate with a light extraction film was 93.2%, and was greater than a total light transmittance (92.0%) of a slide glass with no light extraction film. This is considered that since the light extraction film contains the hollow particles, a refractive index of the light extraction film was reduced, and reflection at an air interface was suppressed, and accordingly, a total light transmittance was improved.

A total light transmittance was measured by the following procedure, in accordance with the method described in JIS K7361-1:1997 "Plastics—Determination of the Total Luminous Transmittance of Transparent Materials—Part 1: Single Beam Instrument".

That is, after stabilization of a device light source, the prepared substrate with a light extraction film is measured by a double beam method with a light source (D65), using a haze mater (Model: HM-150 Type, manufactured by Murakami Color Research Laboratory Co., Ltd.). After a stabilization time of 30 minutes, measurement is performed, and it is confirmed that the device is stabilized. The number of tests was 2, and an average thereof was adopted as a total light transmittance.

Example 8A (Light Guiding Plate Ink•Light Guiding Plate)

The 10 wt % dispersion of the hollow particles in methanol prepared in Example 1A was washed with methyl ethyl ketone to obtain a 10 wt % dispersion of hollow particles in methyl ethyl ketone. 45 parts by weight of the 10 wt % dispersion of the hollow particles in methyl ethyl ketone, 10 parts by weight of an acrylic resin (ACRYDIC A-181 manufactured by DIC, solid content 45%), and 1.0 part by weight of a polyether phosphoric acid ester-based surfactant (Solsperse 41000 manufactured by Lubrizol Japan Limited) were mixed to obtain a light diffusing composition (light guiding ink).

The light diffusing composition was screen-printed on a 5-inch transparent acrylic plate so that a dot pitch became 500 µm and a diameter of a dot became 50 µm, to obtain a light guiding plate.

Second Example

First, details of various measurement methods used in Examples will be described below.
(Average Particle Diameter, Hollow Rate, CV Value)
An average particle diameter, a hollow rate, and a CV value of the hollow particles are measured as in First Example.
(Gel Fraction)
A gel fraction of the hollow particles is measured as follows.
That is, a 10 wt % dispersion of the hollow particles in methanol is dried for 4 hours with a vacuum dryer at 60° C. to obtain a dried powder. About 1 part by weight of the dried hollow particles are collected, precisely weighed ($W_1$ g), immersed in 100 parts by weight of toluene, stirred at 60° C., for 3 hours, and centrifugally separated at 18,000 rpm for 30 minutes using a centrifugal separator, and the supernatant is removed, followed by drying for 4 hours with a vacuum dryer at 60° C. A weight ($W_2$ g) of insolubles is measured. Further, a gel fraction of the hollow particles is obtained from the equation of $W_2/W_1 \times 100$.
In addition, for assessments of a gel fraction, when a gel fraction is 95% or more, this is accessed to be ◯, and when a gel fraction is less than 95%, this is accessed to be x.
(Heat Conductivity)
Heat conductivity of a film using the hollow particles is measured as follows.
That is, 20 parts by weight of a 10 wt % dispersion of the hollow particles in methanol, 4 parts by weight of epoxy acrylate (Ripoxy VR-77 manufactured by SHOWA DENKO K.K.), 0.20 parts by weight of a photopolymerization initiator (IRGACURE 1173 manufactured by BASF), and 0.50 parts by weight of a phosphoric acid ester-based surfactant (Plysurf A-208F manufactured by DSK Co., Ltd.) are mixed, and the mixture is forcibly stirred for 5 minutes using an ultrasound homogenizer (Model SONIFIER 450, manufactured by BRANSON) to obtain a coating agent. 0.5 ml of a mixed solution is added dropwise to a φ 50 stainless disk having the thickness of 1 mm, and coated using a spin coater (Model K-359SD1, manufactured by Kyowa Riken, Co., Ltd.) to obtain a coated film. The resulting coated film is dried at room temperature (about 25° C.) under a normal pressure. The dried coated film is passed through an ultraviolet ray irradiation device (J-Cure manufactured by JATEC, Model JUC1500, drawing speed: 0.4 m/min, peak illuminance: 125 mW/cm$^2$) three times to cure, thereby, a test piece in which a heat insulating film is attached on a stainless disk is prepared.
Using HC-110 manufactured by EKO Instruments, a heat resistance value of the prepared test piece and the thickness of the test piece are measured. The measuring condition is as follows. An upper surface of the test piece is 26.5° C., a lower surface is 23.5° C., and a measurement load is 0.4 MPa. Heat conductivity of the test piece is obtained from the equation of (thickness of test piece)/(heat resistance value−contact resistance value) using the measured thickness and heat resistance value of the test piece. As the contact resistance value, 0.00095 m$^2$·K/W is adopted. In addition, heat conductivity of only a stainless disk with no heat insulating film is 13.4 W/m·K.

(BET Specific Surface Area, Theoretical Specific Surface Area)
In accordance with the BET method (nitrogen adsorption method) described in JIS R1626, a BET specific surface area $S_B$ of the hollow particles is measured.
That is, a 10 wt % dispersion of the hollow particles in methanol is dried for 4 hours with a vacuum dryer at 60° C. to obtain a dried powder. For the dried hollow particles, a BET nitrogen adsorption isothermal line is measured using an automatic specific surface area/pore distribution measuring device (Tristar 3000 manufactured by Shimadzu Corporation), and a specific surface area is calculated from a nitrogen adsorbed amount using a BET multipoint method. In addition, measurement of a nitrogen adsorption isothermal line is performed using a constant volume method under the condition of an adsorption cross-sectional area of 0.162 nm$^2$ using nitrogen as an adsorbate.
Furthermore, a theoretical surface area $S_T$ of the hollow particles, when it is presumed that the hollow particles are perfectly spherical, a surface is smooth, and pinholes do not exist in the shell, is calculated from the following equation (1). In addition, in the equation (1), D indicates a particle diameter of the hollow particles, R indicates a hollow rate, and ρ indicates a true density of the shell.

$$S_T = 6 \times [1+(R/100)^{2/3}] \times [1-(R/100)]^{-1}/(D \times \rho) \quad (1)$$

In the present specification, a theoretical specific surface area of the hollow particles is a value calculated from a theoretical true density when it is presumed that D is an average particle diameter, R is a hollow rate, and ρ is a true density of 1.20 g/cm$^3$, in the equation (1).
(Reflectivity)
In the same manner as in First Example except that, as the surfactant, a phosphoric acid ester-based surfactant (Plysurf A-208F manufactured by DSK Co., Ltd.) is used, reflectivity is measured.

Example 1B

Into a 1 L reactor equipped with a stirrer and a thermometer were placed 35 parts by weight of glycidyl methacrylate, 5 parts by weight of 3-methacryloxypropyltriethoxysilane, 0.8 parts by weight of n-octylmercaptan, and 40 parts by weight of toluene, followed by mixing. Then, an aqueous phase obtained by dissolving 0.8 parts by weight of sodium p-styrenesulfonate and 0.4 parts by weight of potassium persulfate in 720 parts by weight of ion-exchanged water was added. By heating a mixed solution at 70° C., for 10 hours while stirring, polymer particles having a remaining epoxy group were obtained. Since toluene was added to emulsion polymerization, the polymer particles having the remaining epoxy group were swollen with toluene.
Then, in order to polymerize the remaining epoxy group, 20 parts by weight of ethylenediamine was added, and polymerization was performed at 70° C., for 24 hours. By a reaction of the epoxy group in the polymer particles, the polymer and toluene were phase-separated, and a dispersion of microcapsule particles was obtained. The resulting dispersion was washed with methanol three times, removal of toluene in the inside and washing of an unnecessary part were performed, and thereafter, methanol was appropriately added so that the solid content became 10% by weight, to obtain a 10 wt % dispersion of hollow particles in methanol.
The resulting hollow particles had an average particle diameter of 65 nm and a CV value of 18%, and were the hollow particles having high monodispersibility. In addition, a hollow rate was as high as 34%. When a gel fraction was measured, a gel fraction was 99%, and chemical resistance was excellent. A BET specific surface area $S_B$ was 162 m²/g, a theoretical specific surface area $S_T$ was 173 m²/g, $S_B/S_T$ was 0.94, and the hollow particles had little pinholes in the shell.

Furthermore, when the resulting hollow particles were used to prepare a film, and heat conductivity was measured, heat conductivity was as low as 7.8 W/m·K, and the film was excellent in heat insulating property. In addition, when the resulting hollow particles were used to prepare a film, and reflectivity was measured, reflectivity was 7.2%, and low reflection property was excellent.

Example 2B

In the same production method as in Example 1B except that an addition amount of glycidyl methacrylate was changed to 34 parts by weight, and 1 part by weight of methyl methacrylate was further added, particles were obtained.

The resulting hollow particles had an average particle diameter of 60 nm and a CV value of 19%, and were the hollow particles having high monodispersibility. In addition, a hollow rate was as high as 29%. When a gel fraction was measured, a gel fraction was 98%, and chemical resistance was excellent. A BET specific surface area $S_B$ was 178 m²/g, a theoretical specific surface area $S_T$ was 169 m²/g, $S_B/S_T$ was 1.1, and the hollow particles had little pinholes in the shell.

Furthermore, when the resulting hollow particles were used to prepare a film, and heat conductivity was measured, heat conductivity was as low as 7.9 W/m·K, and the film was excellent in heat insulating property. In addition, when the resulting hollow particles were used to prepare a film, and reflectivity was measured, reflectivity was 7.3%, and low reflection property was excellent.

Example 3B

In the same production method as in Example 1B except that an addition amount of glycidyl methacrylate was changed to 34 parts by weight, and 1 part by weight of jER828 (manufactured by Mitsubishi Chemical Corporation, bisphenol A-type liquid epoxy resin, epoxy equivalent 184 to 194) was further added, particles were obtained.

The resulting hollow particles had an average particle diameter of 72 nm and a CV value of 19%, and were the hollow particles having high monodispersibility. In addition, a hollow rate was as high as 30%. When a gel fraction was measured, a gel fraction was 98%, and chemical resistance was excellent. A BET specific surface area $S_B$ was 131 m²/g, a theoretical specific surface area $S_T$ was 144 m²/g, $S_B/S_T$ was 0.91, and the hollow particles had little pinholes in the shell.

Furthermore, when the resulting hollow particles were used to prepare a film, and heat conductivity was measured, heat conductivity was as low as 7.9 W/m·K, and the film was excellent in heat insulating property. In addition, when the resulting hollow particles were used to prepare a film, and reflectivity was measured, reflectivity was 7.3%, and low reflectivity property was excellent.

Comparative Example 1B

Into a 1 L reactor equipped with a stirrer and a thermometer were placed 40 parts by weight of jER828, 40 parts by weight of toluene, and 10 parts by weight of hexadecane, followed by mixing. The resulting mixture was mixed with 720 parts by weight of ion-exchanged water containing 0.4 parts by weight of sodium dodecylbenzenesulfonate as a surfactant, and the mixture was forcibly stirred for 1 hour with an ultrasound homogenizer under an ice bath to obtain a mixed solution. Then, 20 parts by weight of ethylenediamine was added to a mixing solvent, and the mixture was heated at 70° C., for 5 hours, thereby, jER828 and ethylenediamine reacted, and a dispersion of microcapsule particles encapsulating toluene and hexadecane was obtained. The resulting dispersion was washed with methanol three times, removal of cyclohexane and hexadecane in the inside and washing of an unnecessary part were performed, and thereafter, methanol was appropriately added so that the solid content became 10% by weight, to obtain a 10 wt % dispersion of hollow particles (epoxy resin particles) in methanol.

The resulting hollow particles had an average particle diameter of 92 nm and a CV value of 45%, and were the polydisperse hollow particles. In addition, a hollow rate was as high as 42%. When a gel fraction was measured, a gel fraction was 98%, and chemical resistance was excellent. A BET specific surface area $S_B$ was 391 m²/g, a theoretical specific surface area $S_T$ was 146 m²/g, $S_B/S_T$ was 2.7, and the hollow particles had many pinholes in the shell.

Furthermore, when the resulting hollow particles were used to prepare a film, and heat conductivity was measured, heat conductivity was as high as 8.6 W/m·K, and the film was inferior in heat insulating property. In addition, when the resulting hollow particles were used to prepare a film, and reflectivity was measured, reflectivity was 8.1%, and the film was inferior in low reflection property.

The following Table 2 summarizes raw materials used in production of the hollow particles and physical properties.

TABLE 2

| | | | | | Example | | | Comparative Example |
|---|---|---|---|---|---|---|---|---|
| | | | Unit | 1B | 2B | 3B | 1B |
| Raw material | Reactive monomer | Glycidyl methacrylate | Parts by weight | 35 | 34 | 34 | — |
| | | Dipentaerythritol hexaacrylate | Parts by weight | — | — | — | — |
| | | 3-Methacryloxypropyltriethoxysilane | Parts by weight | 5 | 5 | 5 | — |
| | | Methyl methacrylate | Parts by weight | — | 1 | — | — |
| | | jER828 | Parts by weight | — | — | 1 | 40 |
| | Crosslinking agent | Ethylenediamine | Parts by weight | 20 | 20 | 20 | 20 |
| | Chain transfer agent | n-Octylmercaptan | Parts by weight | 0.8 | 0.8 | 0.8 | — |
| | Polymerization initiator | Potassium persulfate | Parts by weight | 0.4 | 0.4 | 0.4 | — |
| | Non-reactive solvent | Toluene | Parts by weight | 40 | 40 | 40 | 40 |
| | | Hexadecane | Parts by weight | — | — | — | 10 |
| | Dispersing aid | Sodium p-styrenesulfonate | Parts by weight | 0.8 | 0.8 | 0.8 | — |
| | | Sodium dodecylbenzenesulfonate | Parts by weight | — | — | — | 0.4 |

TABLE 2-continued

|  |  | Unit | Example 1B | Example 2B | Example 3B | Comparative Example 1B |
|---|---|---|---|---|---|---|
| Assessment | Average particle diameter D | nm | 65 | 60 | 72 | 92 |
|  | CV value | % | 18 | 19 | 19 | 45 |
|  | Hollow rate R | % | 34 | 29 | 30 | 42 |
|  | BET specific surface area $S_B$ | m$^2$/g | 162 | 178 | 131 | 391 |
|  | Theoretical specific surface area $S_T$ | m$^2$/g | 173 | 169 | 144 | 146 |
|  | $S_B/S_T$ | — | 0.94 | 1.1 | 0.91 | 2.7 |
|  | Gel fraction/determination | % | 99/○ | 98/○ | 98/○ | 98/○ |
|  | Heat conductivity | W/m · K | 7.8 | 7.9 | 7.9 | 8.6 |
|  | Reflectivity of film | % | 7.2 | 7.3 | 7.3 | 8.1 |

Figure 2:
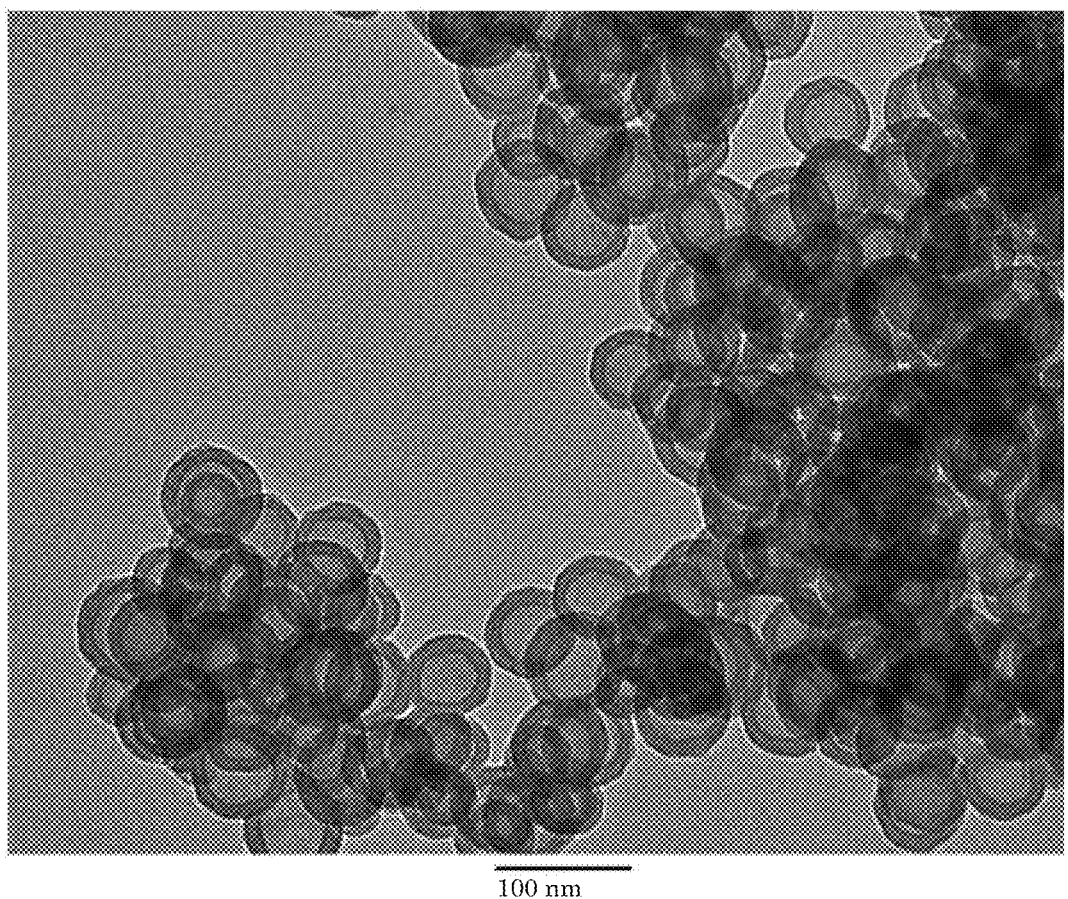
FIG. 2 is a photograph of hollow particles of Example 1B.

A photograph of the hollow particles of Example 1B after staining is shown in FIG. 2.

By comparison between Examples 1B to 3B and Comparative Example 1B in Table 2, it was seen that the hollow particles which have a small diameter and high monodispersibility, and for which heat conductivity and/or reflectivity can be adjusted, can be produced.

Third Example

First, details of various measurement methods used in Third Example will be described below.

(Average Particle Diameter, Hollow Rate, CV Value)

An average particle diameter, a hollow rate, and a CV value of the hollow particles are measured as in First Example.

In this respect, for assessment of a hollow rate of the hollow particles, when a hollow rate is 15% or more, this is assessed to be ○, and when a hollow rate is less than 15%, this is assessed to be x.

(Presence or Absence of Pinholes)

The presence or absence of pinholes in the hollow particles is measured as follows.

That is, 2 parts by weight of the hollow particles, 3 parts by weight of dipentaerythritol hexaacrylate (NK Ester A-DPH manufactured by SHIN-NAKAMURA CHEMICAL CO., LTD.), 20 parts by weight of ethyl acetate as a diluting solvent, and 0.03 parts by weight of a photopolymerization initiator (IRGACURE 1173 manufactured by BASF) are mixed, and the mixed solution is coated on a glass substrate to obtain a coated film. The resulting coated film is dried at room temperature (about 25° C.) under a normal pressure. The dried coated film is passed through an ultraviolet ray irradiation device (J-Cure manufactured by JATEC, Model JUC1500, drawing speed: 0.4 m/min, peak intensity: 125) three times to cure, thereby, a sample piece is prepared.

The sample piece is embedded in an epoxy resin (Quetol812 Set manufactured by Nissin EM Co., Ltd.), and allowed to stand in an oven at 60° C., for 24 hours to cure the epoxy resin. Thereafter, a 70 nm ultrathin piece is prepared with an ultra microtome (LEICA ULTRACUT UCT manufactured by Leica Microsystems, Inc.). As a staining agent, ruthenium tetroxide is used. This ultrathin piece is observed using a transmission electron microscope (H-7600 manufactured by Hitachi High-Technologies Corporation, camera system ER-B manufactured by AMT), thereby, the presence or absence of entrance of a UV curable monomer into the interior of the hollow particles is observed.

In addition, for assessment of the presence or absence of pinholes, in 100 hollow particles, when the number of the hollow particles into which the UV curable monomer entered is 30 or less, this is assessed to be ○, and when the number of the hollow resin particles into which the monomer entered is more than 30, this is determined that many pinholes exist in the shell of the hollow particles, and is assessed to be x.

Example 1C

Into a 1 L reactor equipped with a stirrer and a thermometer were placed 40 parts by weight of glycidyl methacrylate, 0.8 parts by weight of n-octylmercaptan, and 40 parts by weight of butyl acetate, followed by mixing. Then, an aqueous phase obtained by dissolving 0.12 parts by weight of sodium p-styrenesulfonate and 0.4 parts by weight of ammonium persulfate in 720 parts by weight of ion-exchanged water was added. By heating the mixed solution at 70° C., for 10 hours while stirring, the polymer particles in which an epoxy resin remains inside the polymer were obtained. Since butyl acetate was added to emulsion polymerization, the polymer particles in which the epoxy group remained inside the polymer were swollen with butyl acetate.

Then, in order to polymerize the epoxy group remaining inside the polymer, 20 parts by weight of ethylenediamine was added, and polymerization was performed at 70° C. for 24 hours. By a reaction of the epoxy group in the polymer particles, the polymer and butyl acetate were phase-separated to obtain a dispersion of microcapsule particles. The resulting dispersion of the microcapsule particles was washed with ethyl alcohol three times, removal of butyl acetate in the inside and washing of an unnecessary part were performed, and thereafter, drying in a vacuum oven at 60° C. afforded the hollow particles.

The resulting hollow particles had an average particle diameter of 193 nm and a CV value of 10%, and were the hollow particles having high monodispersibility. In addition, a hollow rate was as high as 33%. When the resulting hollow particles were used to perform a test of entrance of a UV curable monomer, the monomer entered one particle, and the hollow particles had very little pinholes.

Example 2C

In the same production method as in Example 1C except that glycidyl methacrylate was changed to 3,4-epoxycyclohexylmethyl acrylate, an amount of butyl acetate was changed from 40 parts by weight to 30 parts by weight, and the dispersing aid was changed to 0.01 parts by weight of sodium p-styrenesulfonate and 0.05 parts by weight of sodium dodecylbenzenesulfonate, particles were obtained.

The resulting hollow particles had an average particle diameter of 181 nm and a CV value of 13%, and were the hollow particles having high monodispersibility. In addition a hollow rate was as high as 21%. When the resulting hollow particles were used to perform a test of entrance of a UV curable monomer, the monomer entered three particles, and the hollow particles had very little pinholes.

Example 3C

In the same production method as in Example 1C except that, as the reactive monomer, 35 parts by weight of glycidyl methacrylate and 5 parts by weight of 3-methacryloxypropyltriethoxysilane were used, and an amount of sodium p-styrenesulfonate was changed from 0.12 parts by weight to 0.8 parts by weight, particles were obtained.

The resulting hollow particles had an average particle diameter of 87 nm and a CV value of 13%, and were the hollow particles having high monodispersibility. In addition, a hollow rate was as high as 35%. When the resulting hollow particles were used to perform a test of entrance of a UV curable monomer, the monomer entered one particle, and the hollow particles had very little pinholes.

Example 4C

In the same production method as in Example 1C except that ethylenediamine was changed to 28 wt % aqueous ammonia, particles were obtained.

The resulting hollow particles had an average particle diameter of 213 nm and a CV value of 11%, and were the hollow particles having high monodispersibility. In addition, a hollow rate was as high as 30%. When the resulting hollow particles were used to perform a test of entrance of a UV curable monomer, the monomer entered one particle, and the hollow particles had very little pinholes.

Example 5C

In the same production method as in Example 1C except that, as the reactive monomer, 25 parts by weight of glycidyl methacrylate and 15 parts by weight of methyl methacrylate were used, an amount of butyl acetate was changed from 40 parts by weight to 50 parts by weight, an amount of ethylenediamine was changed from 20 parts by weight to 15 parts by weight, and sodium p-styrenesulfonate was not used, particles were obtained.

The resulting hollow particles had an average particle diameter of 498 nm and a CV value of 12%, and were the hollow particles having high monodispersibility. In addition, a hollow rate was as high as 42%. When the resulting hollow particles were used to perform a test of entrance of a UV curable monomer, the monomer entered six particles, and the hollow particles had very little pinholes.

Comparative Example 1C

In the same manner as in Comparative Example 1B of Second Example, the hollow particles were obtained.

The resulting hollow particles had an average particle diameter of 92 nm and a CV value of 45%, and were the hollow particles having a wide particle size distribution. In addition, a hollow rate was as high as 42%. When the resulting hollow particles were used to perform a infiltration test of a UV curable monomer, the number of infiltrated particles was 63, and the hollow particles had many pinholes.

TABLE 3

| | | | | Example | | | | | Comparative Example |
|---|---|---|---|---|---|---|---|---|---|
| | | | Unit | 1C | 2C | 3C | 4C | 5C | 1C |
| Raw material | Reactive monomer | Glycidyl methacrylate | Parts by weight | 40 | — | 35 | 40 | 25 | — |
| | | 3,4-Epoxycyclohexylmethyl acrylate | Parts by weight | — | 40 | — | — | — | — |
| | | 3-Methacryloxypropyltriethoxysilane | Parts by weight | — | — | 5 | — | — | — |
| | | Methyl methacrylate | Parts by weight | — | — | — | — | 15 | — |
| | | jER828 | Parts by weight | — | — | — | — | — | 40 |
| | Non-reactive solvent | Butyl acetate | Parts by weight | 40 | 30 | 40 | 40 | 50 | — |
| | | Toluene | Parts by weight | — | — | — | — | — | 40 |
| | | Hexadecane | Parts by weight | — | — | — | — | — | 10 |
| | Chain transfer agent | n-Octylmercaptan | Parts by weight | 0.8 | 0.8 | 0.8 | 0.8 | 0.8 | — |
| | Polymerization initiator | Ammonium persulfate | Parts by weight | 0.4 | 0.4 | 0.4 | 0.4 | 0.4 | — |
| | Crosslinking agent | Ethylenediamine | Parts by weight | 20 | 20 | 20 | — | 15 | 20 |
| | | 28 wt % aqueous ammonia | Parts by weight | — | — | — | 20 | — | — |
| | Dispersing aid | Sodium p-styrenesulfonate | Parts by weight | 0.12 | 0.01 | 0.8 | 0.12 | — | — |
| | | Sodium dodecylbenzenesulfonate | Parts by weight | — | 0.05 | — | — | — | 0.4 |
| Assessment | | Average particle diameter | nm | 193 | 181 | 87 | 213 | 498 | 92 |
| | | CV value | % | 10 | 13 | 13 | 11 | 12 | 45 |
| | | Hollow rate | % | 33 | 21 | 35 | 30 | 42 | 42 |
| | | Determination | — | ○ | ○ | ○ | ○ | ○ | ○ |
| | | Presence or absence of pinholes | Number | 1 | 3 | 1 | 1 | 6 | 63 |
| | | Determination | — | ○ | ○ | ○ | ○ | ○ | x |

Figure 3:
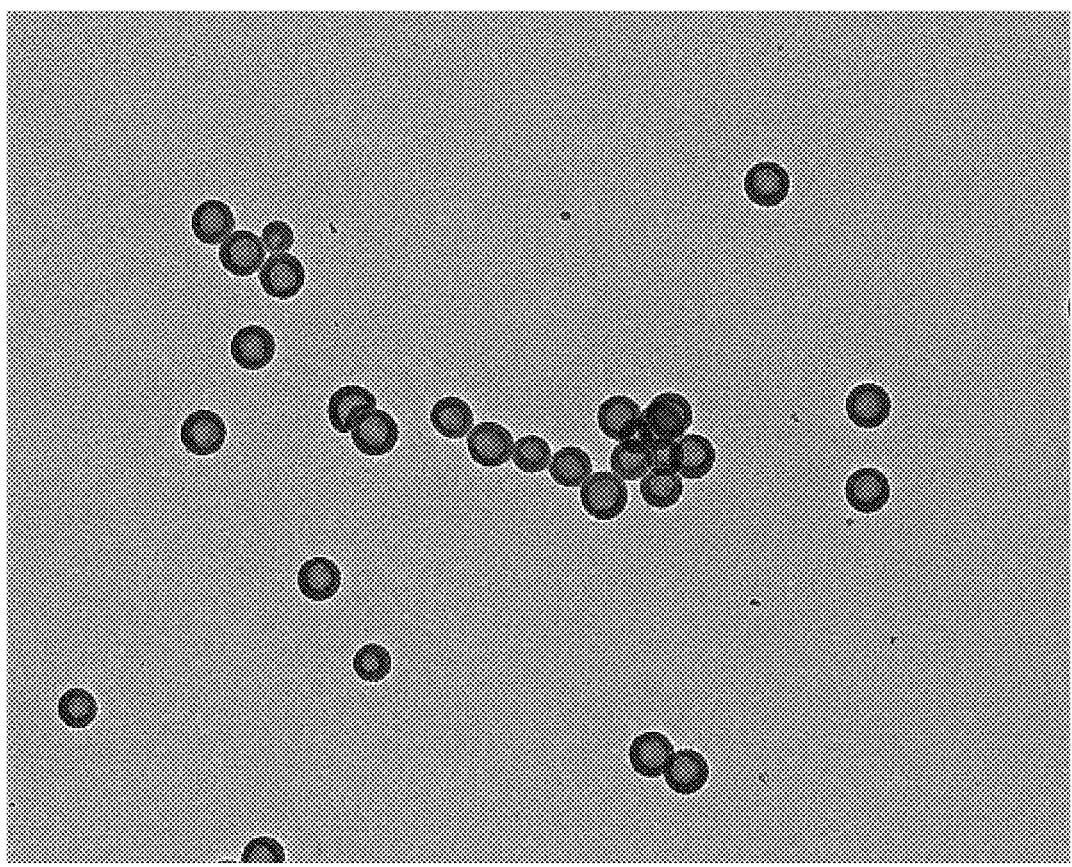
FIG. 3 is a photograph of hollow particles of Example 1C.

A photograph of the hollow particles of Example 1C is shown in FIG. 3.

By comparison between Examples 1C to 5C and Comparative Example 1C in Table 3, it was seen that, by separating polymerization for obtaining the particles and phase separation of the non-reactive solvent, the microcapsule particles and the hollow particles which generate little pinholes, and have a small particle diameter and high monodispersibility can be produced.

What is claimed is:

1. Hollow particles each having a shell including at least one layer, wherein
said hollow particles have an average particle diameter of 10 to 200 nm, and
said at least one layer contains a vinyl-based resin
wherein said vinyl-based resin comprises a crosslinked copolymer derived from a copolymer and a component derived from a crosslinking agent being a polyamine-based compound, wherein the copolymer is derived from at least one radical reactive vinyl monomer having an epoxy group or an oxetane group, and at least one radical reactive vinyl monomer having a silyl group.

2. The hollow particles according to claim 1, wherein said hollow particles exhibit a 5% degradation initiation temperature of from 250 to 350° C.

3. The hollow particles according to claim 1, wherein said radical reactive vinyl monomer having an epoxy group or an oxetane group is p-glycidylstyrene, glycidyl (meth)acrylate, 4-hydroxybutyl (meth)acrylate glycidyl ether, (3-ethyloxetan-3-yl)methyl (meth)acrylate, or 3,4-epoxycyclohexylmethyl (meth)acrylate.

4. The hollow particles according to claim 1, wherein said radical reactive vinyl monomer having a silyl group is vinyltrichlorosilane, vinyltrimethoxysilane, vinyltriethoxysilane, p-styrylmethoxysilane, 3-methacryloxypropyldimethoxysilane, 3-methacryloxypropyltrimethoxysilane, 3-methacryloxypropylmethyldiethoxysilane, 3-methacryloxypropyltriethoxysilane, or 3-acryloxypropyltrimethoxysilane.

5. The hollow particles according to claim 1, wherein
said hollow particles are hollow particles each having a shell including at least one layer,
said hollow particles have an average particle diameter of 10 to 150 nm and a gel fraction of 95% or more,
a BET specific surface area $S_B$ of said hollow particles and a theoretical specific surface area $S_T$ which is calculated from an average particle diameter and a hollow rate satisfy the following equation:

$$0.5 \leq S_B/S_T \leq 2.5.$$

6. The hollow particles according to claim 5, wherein said hollow particles have a hollow rate of 5 to 90%.

7. A dispersion comprising the hollow particles according to claim 1.

8. A coating agent comprising the hollow particles according to claim 1.

9. An antireflection film comprising the hollow particles according to claim 1.

10. A light extraction film comprising the hollow particles according to claim 1.

11. A heat insulating film comprising the hollow particles according to claim 1.

12. A heat conductivity adjusting agent in the form of hollow particles each having a shell comprising at least one layer, wherein
said hollow particles have an average particle diameter of 10 to 150 nm and a gel fraction of 95% or more, and
said at least one layer contains a vinyl-based resin,
wherein said vinyl-based resin comprises a crosslinked copolymer derived from a copolymer and a component derived from a crosslinking agent being a polyamine-based compound, wherein the copolymer is derived from at least one radical reactive vinyl monomer having an epoxy group or an oxetane group, and at least one radical reactive vinyl monomer having a silyl group.

13. The heat adjusting agent according to claim 12 having a 5% degradation initiation temperature of from 250 to 350° C.

14. A method for producing the hollow particles according to claim 1, comprising:
(a) vinyl-based polymerizing:
i) the at least one radical reactive vinyl monomer having epoxy group or an oxetane group, and
ii) the at least one radical reactive vinyl monomer having a silyl group,
in a dispersing medium, in the presence of a non-reactive solvent incompatible with said dispersing medium, and
(b) crosslinking with the polyamine-based compound to produce the hollow particles; or
(c) vinyl-based polymerizing:
i) the at least one radical reactive vinyl monomer having an epoxy group or an oxetane group, and
ii) the at least one radical reactive vinyl monomer having a silyl group,
in the absence of said non-reactive solvent, and
absorbing said non-reactive solvent, thereby, preparing polymer particles containing said non-reactive solvent, and
(d) crosslinking with the polyamine-based compound, thereby phase-separating said non-reactive solvent from said polymer particles containing said non-reactive solvent to produce the hollow particles.

15. The method according to claim 14, wherein:
the at least one radical reactive vinyl monomer having an epoxy group or an oxetane group comprises a vinyl group, a (meth)acryloyl group, an allyl group, a maleoyl group, a fumaroyl group, a styryl group, or a cinnamoyl group, and
the at least one radical reactive vinyl monomer having a silyl group comprises a vinyl group, a (meth)acryloyl group, an allyl group, a maleoyl group, a fumaroyl group, a styryl group, or a cinnamoyl group.

16. The method according to claim 14, wherein
the radical reactive vinyl monomer having an epoxy group or an oxetane group is p-glycidylstyrene, glycidyl (meth)acrylate, 4-hydroxybutyl (meth)acrylate glycidyl ether, or 3,4-epoxycyclohexylmethyl (meth)acrylate; and
the radical reactive vinyl monomer having a silyl group is vinyltrichlorosilane, vinyltrimethoxysilane, vinyltriethoxysilane, p-styrylmethoxysilane, 3-methacryloxypropyldimethoxysilane, 3-methacryloxypropyltrimethoxysilane, 3-methacryloxypropylmethyldiethoxysilane, 3-methacryloxypropyltriethoxysilane, or 3-acryloxypropyltrimethoxysilane;
said dispersing medium is selected from water, ethanol, methanol, isopropyl alcohol, butane, pentane, hexane, cyclohexane, heptane, decane, hexadecane, toluene, xylene, ethyl acetate, butyl acetate, methyl ethyl ketone, methyl isobutyl ketone, methyl chloride, methylene chloride, chloroform, and carbon tetrachloride; and said non-reactive solvent is a solvent incompatible with said dispersing medium, and is selected from butane, pentane, hexane, cyclohexane, heptane, decane, hexadecane, toluene, xylene, ethyl acetate, butyl acetate, methyl ethyl ketone, methyl isobutyl ketone, 1,4-dioxane, methyl chloride, methylene chloride, chloroform, and carbon tetrachloride.

17. The method according to claim 14 further comprising removing a non-reactive solvent encapsulated in the hollow particles.

* * * * *